United States Patent
Sugiyama

(10) Patent No.: US 7,286,727 B2
(45) Date of Patent: Oct. 23, 2007

(54) OPTICAL COMMUNICATION DEVICE AND OPTICAL DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 11/101,485

(22) Filed: Apr. 8, 2005

(65) Prior Publication Data
US 2006/0159384 A1    Jul. 20, 2006

(30) Foreign Application Priority Data
Jan. 14, 2005    (JP)   ............................. 2005-007854

(51) Int. Cl.
G02F 1/035    (2006.01)
(52) U.S. Cl. ................. 385/3; 385/14; 385/8
(58) Field of Classification Search ................ 385/1–5, 385/8–10, 14
See application file for complete search history.

(56) References Cited

U.S. PATENT DOCUMENTS 6,961,166 B2 *  11/2005  Wooten et al. ............... 359/245

FOREIGN PATENT DOCUMENTS

| JP | 6-18735 | 1/1994 |
|---|---|---|
| JP | 6-59291 | 3/1994 |
| JP | 2001-109022 | 4/2001 |

\* cited by examiner

Primary Examiner—Kevin S. Wood
(74) Attorney, Agent, or Firm—Stass & Halsey LLP

(57) ABSTRACT

An optical communication device includes a substrate which has electro-optical effect; a first optical modulator which has a pair of waveguides formed in the substrate; a second optical modulator which has a pair of waveguides formed in the substrate; a waveguide coupler which is provided in an out put of the first optical modulator, the waveguide coupler being able to couple and branch light propagating through the pair of waveguides of the first optical modulator; and a delay connecting section which gives differential delay to the output branched by the waveguide coupler and inputs the output to the pair of waveguide of the second optical modulator. As a result, the optical communication device and optical device in which insertion loss is reduced compared with the conventional optical modulator can be provided.

24 Claims, 19 Drawing Sheets

OPTICAL COMMUNICATION DEVICE AND OPTICAL DEVICE

CROSS REFERENCE TO RELATED APPLICATIONS

This application is based on and hereby claims priority to Japanese Application No. 2005-7854 filed on Jan. 14, 2005 in Japan, the contents of which are hereby incorporated by reference.

BACKGROUND OF THE INVENTION (1) Field of the Invention

The present invention relates to an optical communication device and an optical device which are used in optical communication, particularly to an RZ optical modulator which is of the optical communication device generating an RZ (Return to Zero) signal.

(2) Description of the Related Art

The optical modulators in which electro-optical crystals such as a $LiNbO_3$ (lithium niobate (LN) ) crystal substrate and a $LiTaO_2$ (lithium tantalate) crystal substrate are used can be cited as typical representatives of the optical communication device. For production of the optical communication device, an optical waveguide is formed by depositing a metal film on a part of the crystal substrate to perform thermal diffusion or by patterning the metal film to perform proton exchange in a benzoic acid solution, and then electrodes are provided near the optical waveguide.

For example, the optical waveguide includes an incident waveguide, a parallel waveguide and an outgoing waveguide. A signal electrode (also referred to as hot electrode) and a ground electrode are provided on the parallel waveguide, and a coplanar electrode is formed by the signal electrode and the ground electrode. In the case of the use of the substrate (Z-cut substrate) whose surface is cut out in a Z-axial direction of a crystal orientation, because a refractive-index change by an electric field in a Z-direction is utilized, the electrode is arranged immediately above the waveguide. At this point, the signal electrode and the ground electrode are patterned on each parallel waveguide, and a dielectric layer (buffer layer) is provided between the LN substrate and the signal electrode and ground electrode in order that a light propagating through the parallel waveguide is prevented from being absorbed by the signal electrode and the ground electrode. For example, $SiO_2$ whose thickness ranges from 0.2 to 1 µm is used as the buffer layer.

When the optical communication device is driven at high speed, terminals of the signal electrode and ground electrode are connected with a resistor to form a progressive wave electrode, and a microwave electric signal is applied from the input side. At this point, phase difference between parallel waveguides (for example, A and B) is changed such that refractive indexes of two parallel waveguides A and B are changed by the electric field to $+\Delta na$ and $-\Delta nb$ respectively, which outputs the intensity-modulated signal light from the outgoing waveguide. An effective index of the microwave is controlled by changing the sectional shape of the electrode, and the speed of the light and the speed of the microwave are matched with each other, which allows light response characteristics to be obtained in a wide band.

As shown in FIG. 16, an example of the optical modulator which can generate the RZ (Return to Zero) signal includes the RZ optical modulator in which two optical modulators (intensity modulators) 100-1 and 100-2 are connected in tandem.

In the RZ optical modulator shown in FIG. 16, the first optical modulator 100-1 and the second optical modulator 100-2 are formed on a substrate 100 made of LN or LT. The first optical modulator 100-1 includes an incident waveguide 101, a first incident-side Y branching waveguide 102, first parallel waveguides 103A and 103B, a first outgoing-side Y branching waveguide 104, a first signal electrode 109 and a first ground electrode 110. A part of the first signal electrode 109 overlaps one (103A) of the first parallel waveguides 103A and 103B, and a part of the ground electrode 110 overlaps the other (103B) of the first parallel waveguides 103A and 103B. The second optical modulator 100-2 includes a second incident-side Y branching waveguide 105, second parallel waveguides 106A and 106B, a second outgoing-side Y branching waveguide 107, an outgoing waveguide 108, a second signal electrode 112, and a second ground electrode 113. A part of the second signal electrode 112 overlaps one (106A) of the second parallel waveguides 106A and 106B, and a part of the ground electrode 113 overlaps the other (106B) of the second parallel waveguides 106A and 106B. In FIG. 16 the numeral 111 designates the ground electrode 111.

In the RZ optical modulator having the above configuration, when a clock signal (microwave electric signal) 200 is supplied to the first signal electrode 109, the refractive index of the parallel waveguide 103A is changed in response to the voltage change in the clock signal, which generates the phase change in an incident light (CW light) propagating the parallel waveguide 103A. Therefore, in the outgoing-side Y branching optical waveguide 104, optical interference (constructive interference and destructive interference) occurs between the light from the parallel waveguides 103A and 103B to generate an optical clock signal (optical flashing signal) 300.

When a data (NRZ data) signal (microwave electric signal) 400 is supplied to the second signal electrode 112, similarly the refractive index of the parallel waveguide 106A is changed in response to the voltage change in the clock signal, which generates the phase change in the light (optical clock signal 300) propagating the parallel waveguide 106A. Therefore, in the outgoing-side Y branching optical waveguide 107, the optical interference occurs between the light from the parallel waveguides 106A and 106B to output an optical modulation signal (RZ signal) 500 from the waveguide 108. The optical modulation signal 500 has a waveform corresponding to a composite signal wave form of the clock signal 200 and the data signal 400.

In the optical modulator shown in FIG. 16, both the pre-stage and post-stage optical modulators 100-1 and 100-2 are formed as the intensity modulator. However, as shown in FIG. 17, sometimes the post-stage optical modulator 100-2 is formed as a phase modulator.

In the optical modulator shown in FIG. 17, the post-stage optical modulator 100-2 includes one waveguide (phase-modulation waveguide) 158, the signal electrode 112, and the ground electrodes 111 and 113. The waveguide 158 is coupled to the outgoing-side Y branching waveguide 104 of the pre-stage optical modulator 100-1 to form an interaction area. A part of the signal electrode 112 overlaps the waveguide 158. In FIG. 17, the constituent indicated by the same numeral represents the identical or similar constituent described above unless otherwise noted.

When the data (NRZ data) signal (microwave electric signal) 400 is supplied to the signal electrode 112 of the post-stage optical modulator 100-2, as with the optical modulator shown in FIG. 16, the phase modulation is performed to the clock signal from the pre-stage optical modulator 100-1 in response to the data signal 400, and the desired RZ signal can be obtained.

Further, the optical communication device having the waveguide structure includes the technologies proposed by Japanese Patent Application Laid-Open No. HEI 6-59291, Japanese Patent Application Laid-Open No. HEI 6-18735, and Japanese Patent Application Laid-Open No. 2001-109022.

Japanese Patent Application Laid-Open No. HEI 6-59291 discloses a waveguide type multiplexing/demultiplexing device. In order to prevent enlargement of the substrate, a connecting space is eliminated to realize miniaturization, and the number of production devices per one substrate is increased to achieve cost reduction. Therefore, the plural waveguide type multiplexing/demultiplexing devices are connected to one another using S-shaped curved waveguides and semi-circular waveguides so that the waveguide type multiplexing/demultiplexing devices are arranged adjacent to one another.

Japanese Patent Application Laid-Open No. HEI 6-18735 also discloses the waveguide type multiplexing/demultiplexing device. Input and output terminals of the plural Mach-Zehnder type multiplexing and demultiplexing device are arranged in one side to enable the miniaturization and the cost reduction. The Mach-Zehnder type multiplexing/demultiplexing device realizes multiplex transmission of four wavelength including two waves in a 1.3 μm band and two waves in a 1.5 μm band.

Japanese Patent Application Laid-Open No. 2001-109022 discloses an add-drop filter with switching function. The add-drop filter with switching function includes plural two-input and two-output type Mach-Zehnder interferometers. The two-input and two-output type Mach-Zehnder interferometer has two directional couplers or two 2×2 MMI (Multi Mode Interference) couplers, in which two optical waveguides formed on the substrate are brought close to each other. At least one of waveguides (arm portions) in the Mach-Zehnder interferometer includes an optically induced grating or a heater. The Mach-Zehnder interferometers in which the gratings are formed and thermo-optical switches are integrated on the silicon substrate, which realizes the miniaturization and low insertion loss.

In the RZ optical modulators shown in FIGS. 16 and 17, since the clock-signal optical modulator 100-1 and the data-signal optical modulator 100-2 are arranged in series in the light propagating direction, a chip length is doubled when compared with the NRZ optical modulator. As an interaction length, i.e. the lengths of the waveguides (arm portion) 103A and 103B (or 106A and 106B) is increased, drive voltage can be reduced. However, in the RZ optical modulator, because the interaction length is restricted by a chip size, there is a limitation in the reduction of the drive voltage.

Therefore, as shown in FIGS. 18 and 19, the clock-signal optical modulator 100-1 and the data-signal optical modulator 100-2 are arranged in parallel on the substrate 100, and the two optical modulator 100-1 and 100-2 (between the outgoing-side Y branching waveguide 104 and the incident-side Y branching waveguide 105 or a waveguide 158) are connected using a semi-circular folding (bending) waveguide 114. In FIGS. 18 and 19, the numeral 115 designates a groove portion 115 formed along an arc of the folding waveguide 114 in the substrate 100. Light entrapment in the folding waveguide 114 is enhanced by providing the groove portion 115, which allows the loss caused by leaky (radiated) light to be suppressed in the folding waveguide 114. In FIGS. 18 and 19, the constituent indicated by the same numeral represents the identical or similar constituent described above unless otherwise noted.

However, in the above configuration, a portion where the radiated light is generated is increased by the use of the folding waveguide 114 or by the increase in waveguide length, which generates a problem that the light insertion loss is increased. Since the technologies disclosed in Japanese Patent Application Laid-Open No. HEI 6-59291, Japanese Patent Application Laid-Open No. HEI 6-18735, and Japanese Patent Application Laid-Open No. 2001-109022 differ from the present invention in objects and application targets, even if these technologies exist, or even if theses technologies are collected, the problems cannot be solved.

SUMMARY OF THE INVENTION

In view of the foregoing, an object of the invention is to provide an optical communication device and optical device with low loss and low insertion loss compared with the conventional optical communication device and optical device.

In order to achieve the object, an optical communication device of the invention includes a substrate which has electro-optical effect; a first optical modulator which has a pair of waveguides formed in the substrate; a second optical modulator which has a pair of waveguides formed in the substrate; a waveguide coupler which is provided in an output of the first optical modulator, the waveguide coupler being able to couple and branch light propagating through the pair of waveguides of the first optical modulator; and a delay connecting section which gives differential delay to the output branched by the waveguide coupler and inputs the output to the pair of waveguide of the second optical modulator.

In an optical communication device of the invention, it is also possible that the first optical modulator is configured as a clock modulator which is driven by a clock signal and the second optical modulator is configured as a data modulator which is driven by a data signal.

In an optical communication device of the invention, it is preferable that the differential delay by the delay connecting section is set to the differential delay corresponding to a half of wave of the clock signal.

In an optical communication device of the invention, it is also possible that the second optical modulator is formed on the substrate in parallel with the first optical modulator and the delay connecting section is configured as a fold-back delay connecting section having bending waveguides which fold back two outputs of the waveguide coupler to connect the two outputs to the pair of waveguides of the second optical modulator.

Further, an optical device of the invention includes a branching section which branches an input light; a phase control section which controls a phase relation between a first light and a second light, which are branched by the branching section; a coupling section which couples the first light and the second light after the control of the phase relation, the coupling section outputting a third signal light in which intensity is periodically changed and a fourth signal light in which the intensity is periodically changed and a signal phase of the fourth signal light is different from that of the third signal light; a phase adjusting section which adjusts the phases so that the signal phase of the third signal light and the signal phase of the fourth signal light become the same phase, the phase adjusting section outputting a fifth phase adjusted light and a sixth phase adjusted light; and an optical modulating section which performs modulation using the fifth phase adjusted light and the sixth phase adjusted light.

According to the optical communication device (optical device) of the invention, the output of the first optical modulator is branched by the waveguide coupler, the differential delay is given to each output by the delay connecting section, and the outputs is inputted to the second optical modulator. Namely, the phase relationship between the first light and the second light which are obtained by branching the input light is controlled by the phase control section, the light are coupled to output the third signal light in which the intensity is periodically changed and the fourth signal light whose signal phase is different from that of the third signal light, and the phases are adjusted by the phase adjusting section so that the signal phases of the third signal light and the fourth signal light become equal to each other. Therefore, the modulation is performed by the optical modulating section using the phase adjusted light obtained by the phase adjusting section, so that even the light which is lost as the radiated (leaky) light in the conventional technology can be used for the second optical modulator. As a result, the insertion loss can be reduced compared with the conventional optical modulator.

DESCRIPTION OF THE PREFERRED EMBODIMENTS

[A]Description of an Embodiment

Figure 1:
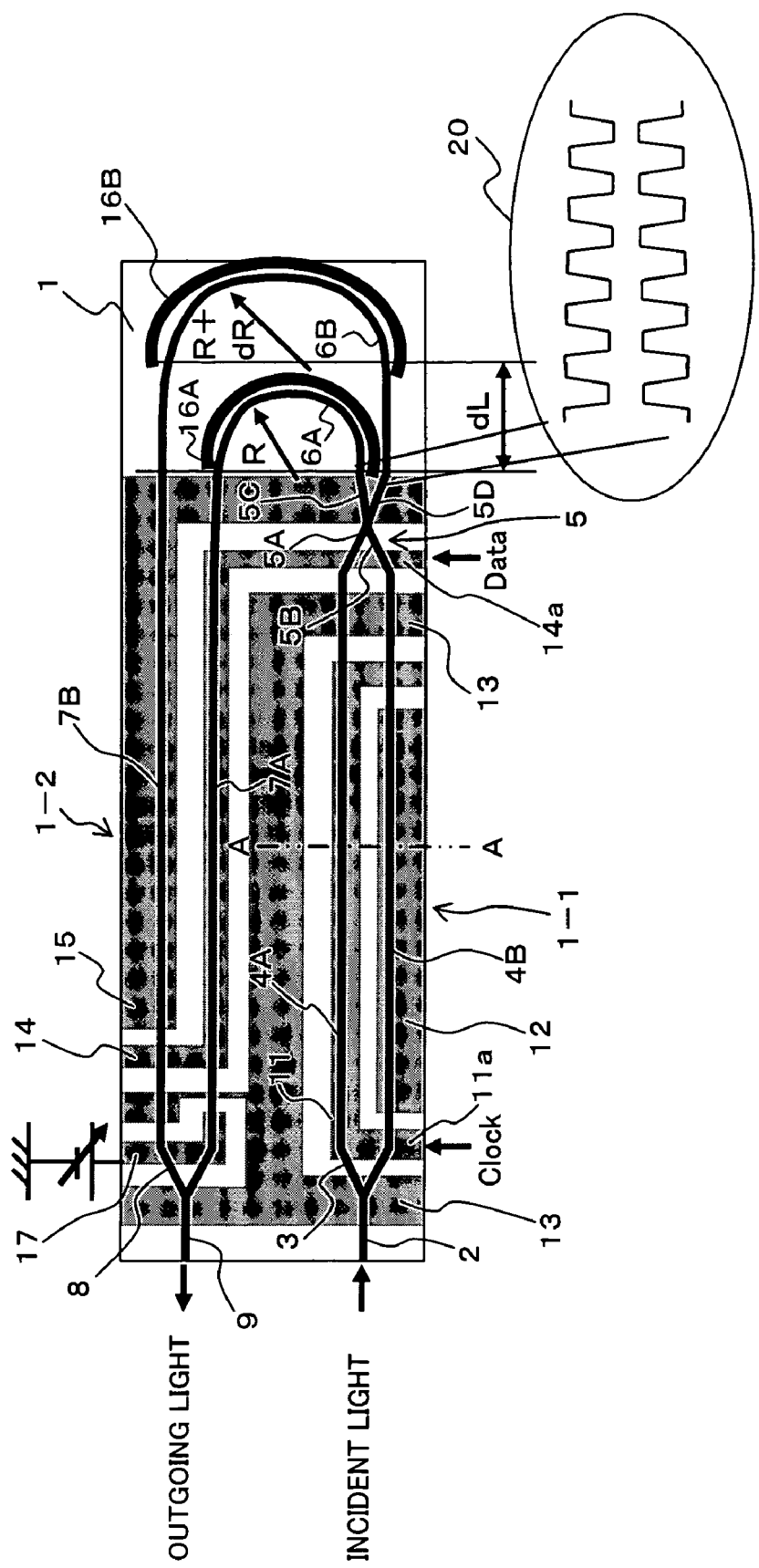
FIG. 1 is a schematic plan view showing a configuration of an RZ optical modulator which is of an optical communication device according to an embodiment of the invention.

FIG. 1 is a schematic plan view showing a configuration of an RZ optical modulator which is of an optical communication device according to an embodiment of the invention. In the RZ optical modulator shown in FIG. 1, a first optical modulator 1-1 and a second optical modulator 1-2 are formed in a substrate 1 made of a material, such as a $LiNbO_3$ (LN) crystal or a $LiTaO_2$ (LT) crystal, having the electro-optical effect. The first and second optical modulators 1-1 and 1-2 have the waveguide structure, and the optical modulators 1-1 and 1-2 are connected by semicircular folding (bending) waveguides 6A and 6B formed on the substrate 1.

The first optical modulator 1-1 and second optical modulator 1-2 are formed on the substrate 1. The first optical modulator 1-1 includes an incident waveguide 2 for allowing incident light (CW light) to propagate, an incident-side Y branching waveguide (branching section) 3, parallel waveguides (arm portion, a pair of waveguides) 4A and 4B. The incident-side Y branching waveguide 3 branches the input light. The interaction area is formed in the parallel waveguides 4A and 4B. The second optical modulator 1-2 includes parallel waveguides (arm portion, a pair of waveguides) 7A and 7B, an outgoing-side Y branching waveguide 8, and an outgoing waveguide 9 for allowing outgoing light to propagate. The interaction area is formed in the parallel waveguides 7A and 7B. The outgoing-side Y branching waveguide 8 couples the light from the parallel waveguides 7A and 7B. Further, an intersecting waveguide (waveguide coupler (2×2 coupler)) 5 and bending waveguides 6A and 6B are formed in the substrate 1. The 2×2 coupler 5 is connected to each of the parallel waveguides 4A and 4B. The bending waveguides 6A and 6B connect the outputs of the 2×2 coupler 5 and the parallel waveguides 7A and 7B of the second optical modulator 1-2.

Even in the embodiment, each of the waveguides (the numerals are omitted) including the 2×2 coupler 5 are formed by depositing the metal film on a part of the substrate 1 to perform the thermal diffusion or by patterning the metal film to perform the proton exchange in the benzoic acid solution. In the case of the use of the substrate (Z-cut substrate) 1 whose surface is cut out in the Z-axial direction of a crystal orientation, because the refractive-index change by the electric field in the Z-direction is utilized, the electrode is arranged immediately above the waveguide.

Namely, signal electrodes (hot electrodes) 11 and 14 and ground electrodes 12 and 15 are patterned on each of the parallel waveguides 4A, 4B, 7A, and 7B to form the signal electrodes (hot electrodes) 11 and 14 and the ground electrodes 12 and 15 on the substrate 1. Therefore, a part of the signal electrode 11 is arranged to overlap the parallel waveguide 4A in the first optical modulator 1-1, a part of the ground electrode 12 is arranged to overlap the parallel waveguide 4B, a part of the signal electrode 14 is arranged to overlap the parallel waveguide 7A in the second optical modulator 1-2, and a part of the ground electrode 15 is arranged to overlap the parallel waveguide 7B.

In FIG. 1, the numeral 13 also designates the ground electrode, and the numeral 17 designates a direct current (DC) bias electrode for controlling DC bias which controls a drive operating point of the second modulator 1-2. The numeral 11a designates an RF input pad which inputs a microwave (RF) electric signal (clock signal) to the signal electrode 11, and the numeral 14a designates an RF input pad which inputs a microwave (RF) electric signal (data signal) to the signal electrode 14. Both the RF input pad 11a and the RF input pad 14a are arranged on one of long sides of the substrate 1. Further, even in the embodiment, in order that the signal electrodes 11 and 14 and the ground electrodes 12 and 15 are prevented from absorbing the light propagating through the parallel waveguides 4A, 4B, 7A, and 7B, the dielectric layer (buffer layer) can be provided between the substrate 1 and the signal electrodes 11 and 14 and ground electrodes 12 and 15. For example, $SiO_2$ whose thickness ranges from 0.2 to 1 μm is used as the buffer layer.

Figure 16:
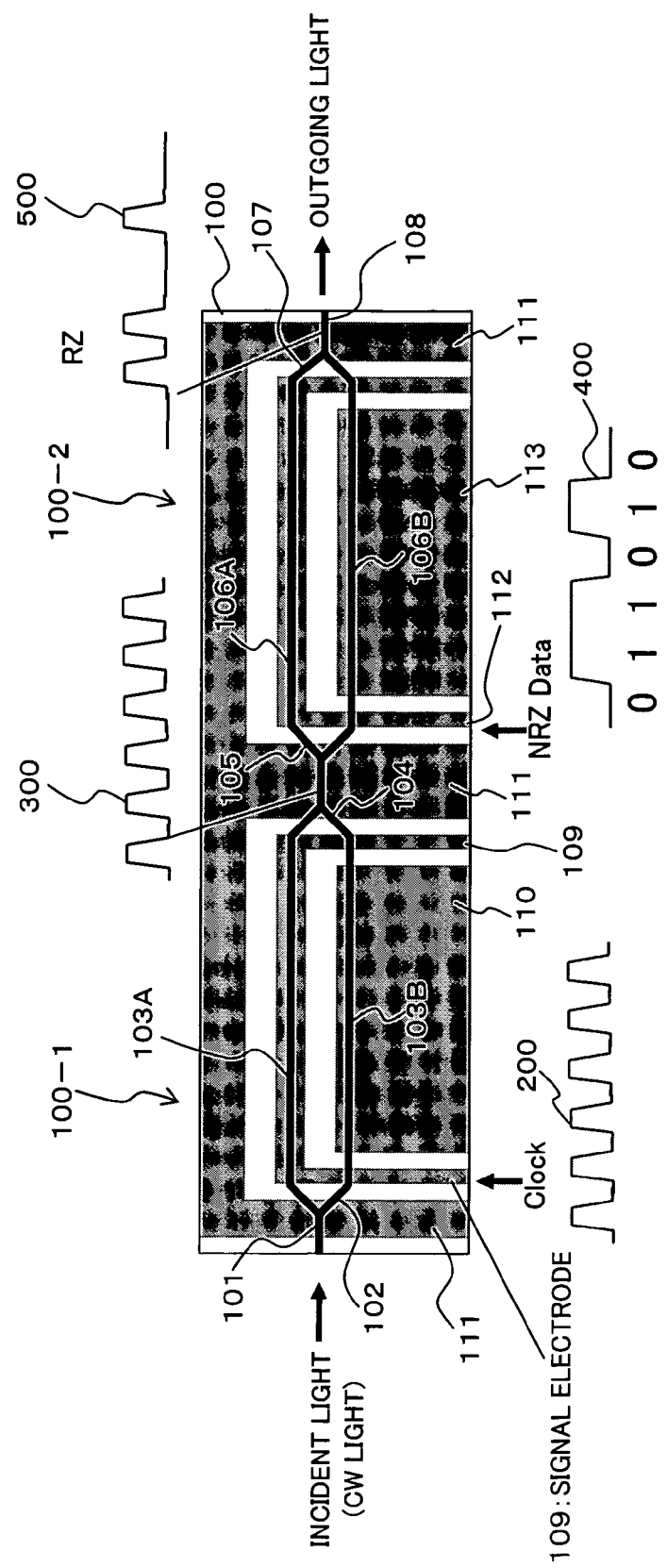
FIG. 16 is a schematic plan view showing a configuration of an RZ optical modulator.
Figure 17:
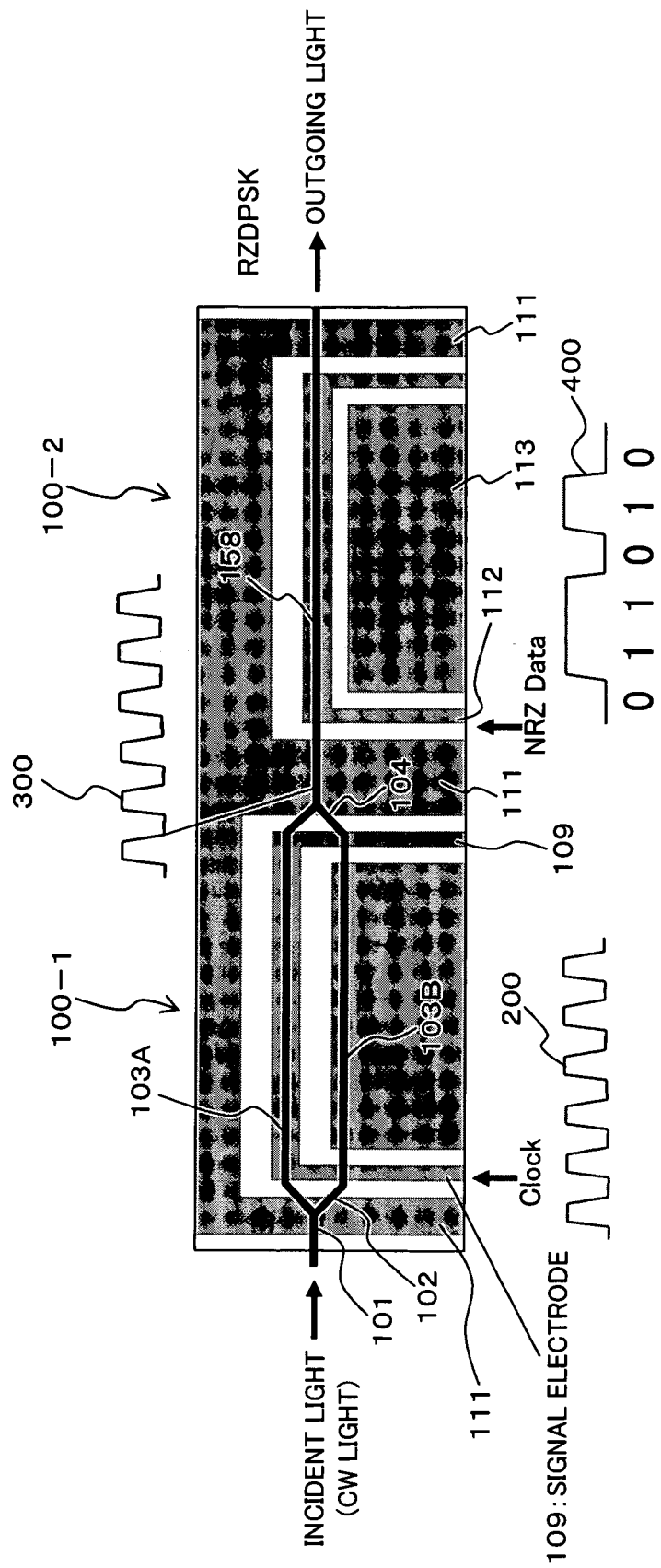
FIG. 17 is a schematic plan view showing another configuration of the RZ optical modulator.
Figure 18:
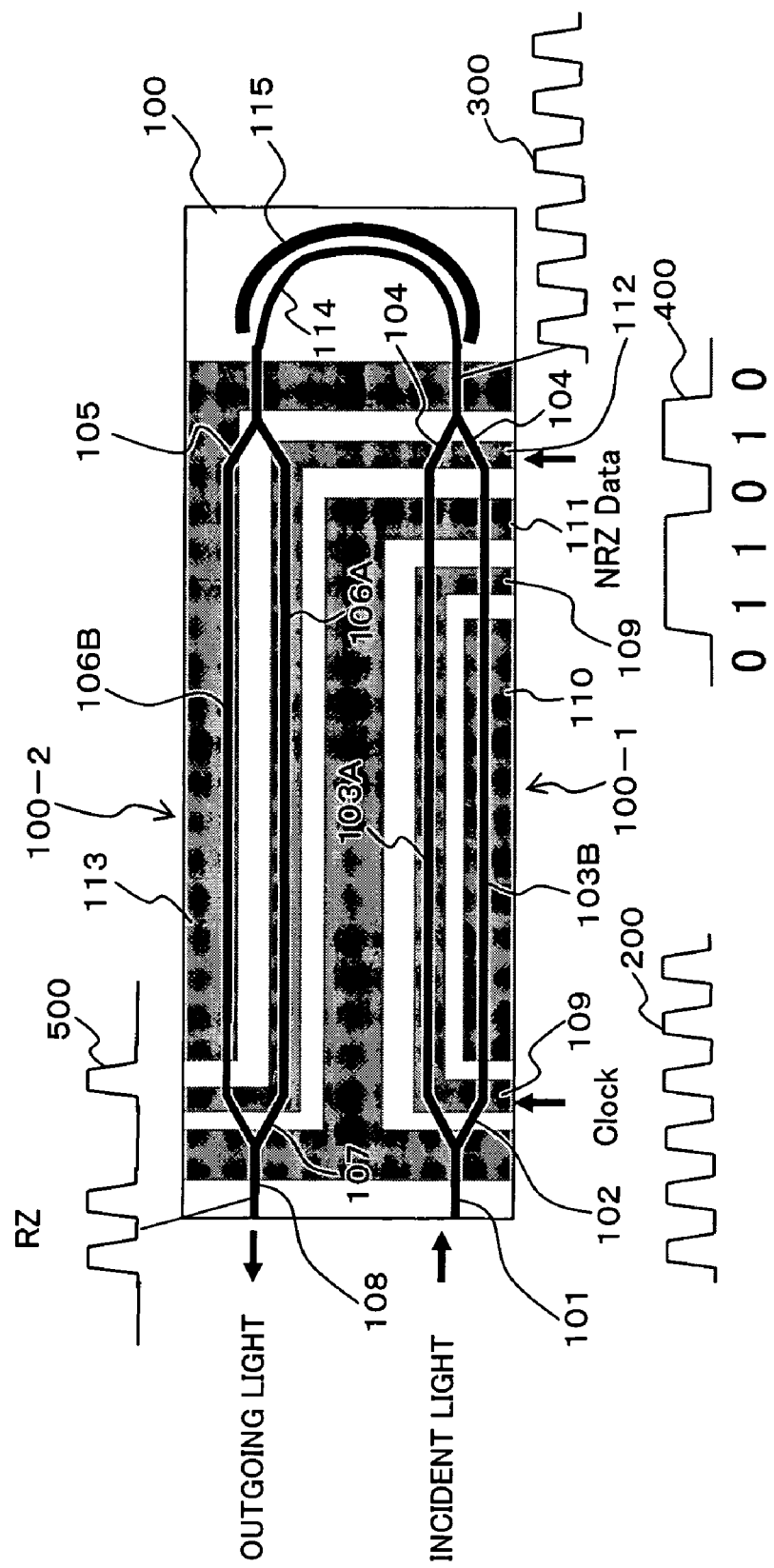
FIG. 18 is a schematic plan view showing another configuration of the RZ optical modulator.
Figure 19:
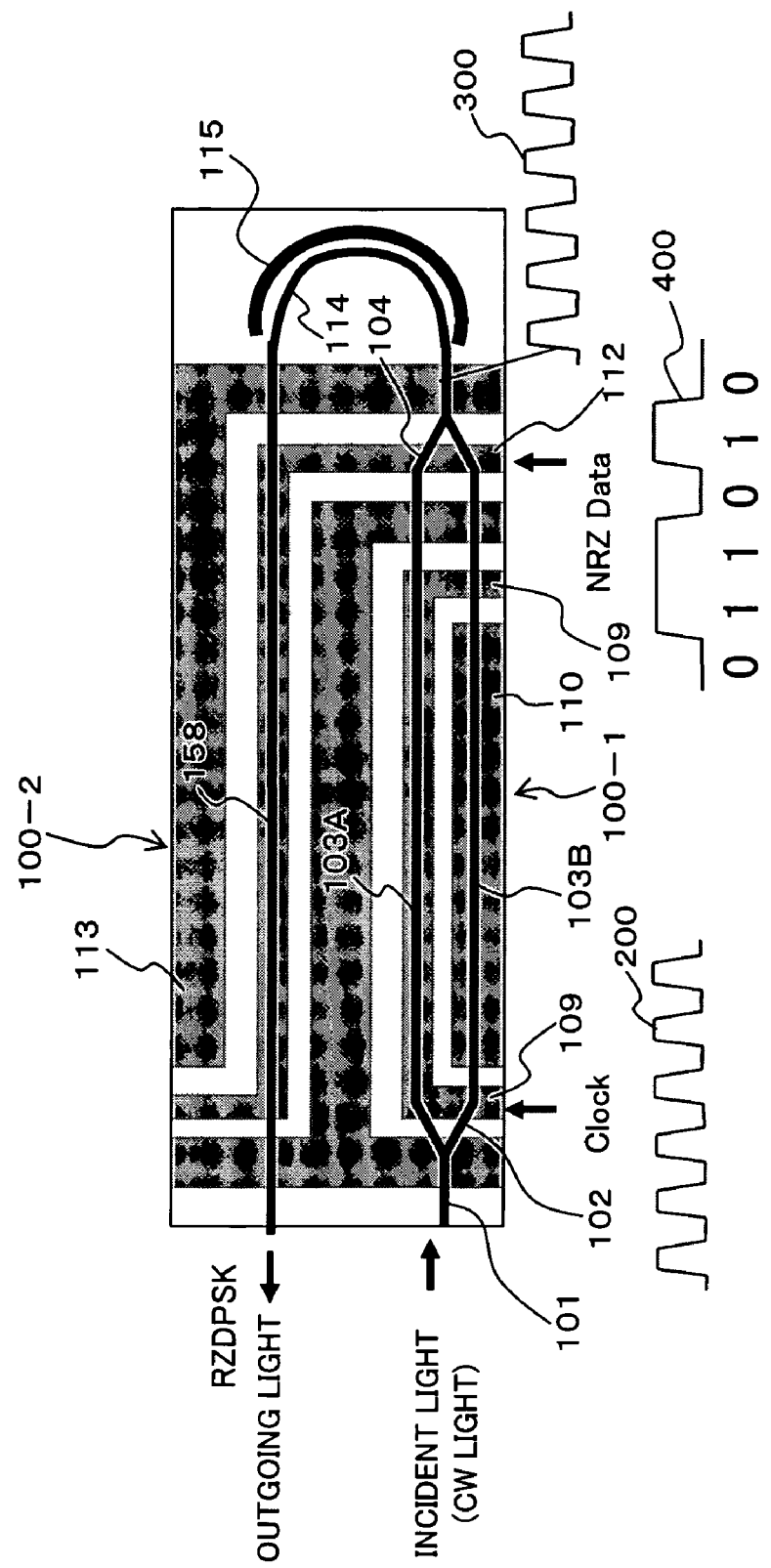
FIG. 19 is a schematic plan view showing another configuration of the RZ optical modulator.

The clock signal which is of the microwave electric signal is supplied to the signal electrode 11 in the first optical modulator 1-1, and the data signal (NRZ data signal) which is of the microwave electric signal is supplied to the signal electrode 14 in the second optical modulator 1-2. Therefore, the intensity modulation of the incident light can be performed to the RZ (Return to Zero) signal as the outgoing light (optical modulation signal) by the same principle as for the RZ optical modulator described in FIG. 16. The first optical modulator 1-1 functions as the clock modulator. The clock modulator outputs the optical clock signal by inputting the clock signal to modulate the incident light with the clock signal. Namely, the first optical modulator 1-1 functions as the phase controlling section. The phase controlling section controls the phase relationship between the first light and the second light, which are branched by the incident-side Y branching waveguide 3. The second optical modulator 1-2 functions as the data modulator. The data modulator outputs the optical RZ signal by inputting the NRZ data signal to modulate the incident light (optical clock signal from the clock modulator 1-1) with the NRZ data signal.

When the light (optical clock signal) propagating through the parallel waveguides 4A and 4B is inputted to the 2×2 coupler 5 provided in the output stage in the pre-stage clock modulator 1-1, the 2×2 coupler 5 outputs light compensation signals in which phases are mutually inverted (see the numeral 20) by coupling the optical clock signals to branch the optical clock signal. Namely, after the first optical modulator which is of the phase controlling section controls the phase relationship, the 2×2 coupler 5 functions as the coupling section. The coupling section couples the first and second light to output the third signal light in which the intensity is periodically changed and the fourth signal light in which the intensity is periodically changed and the signal phase of the fourth signal light is different from that of the third signal light. For example, the 2×2 MMI coupler can be used as the 2×2 coupler 5.

Figure 3:
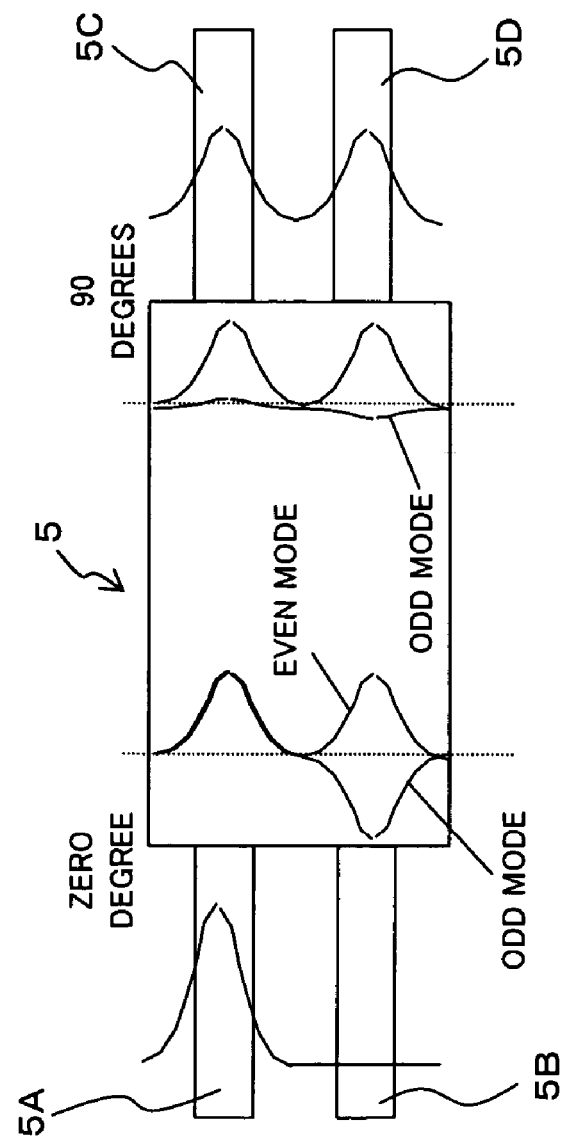
FIG. 3 is a schematic view for explaining an operating principle of a 2×2 MMI coupler which is of a waveguide coupler shown in FIG. 1.

As shown in FIG. 3, in the 2×2 MMI coupler, because excited modes are different from each other in propagation speed, powers of the light incident to the input ports (arm portions) 5A and 5B are evenly distributed to the output ports (arm portions) 5C and 5D by utilizing the change in phase difference between the modes (even mode and odd mode) according to a propagation distance. When the phase difference between the modes becomes 90°, the light powers are distributed to the output ports 5C and 5D, i.e. the light powers are distributed to the bending waveguides 6A and 6B in the embodiment. At this point, unlike the use of the Y branching waveguide, the leaky light hardly exists and the loss hardly exists in the optical clock signal.

Figure 4:
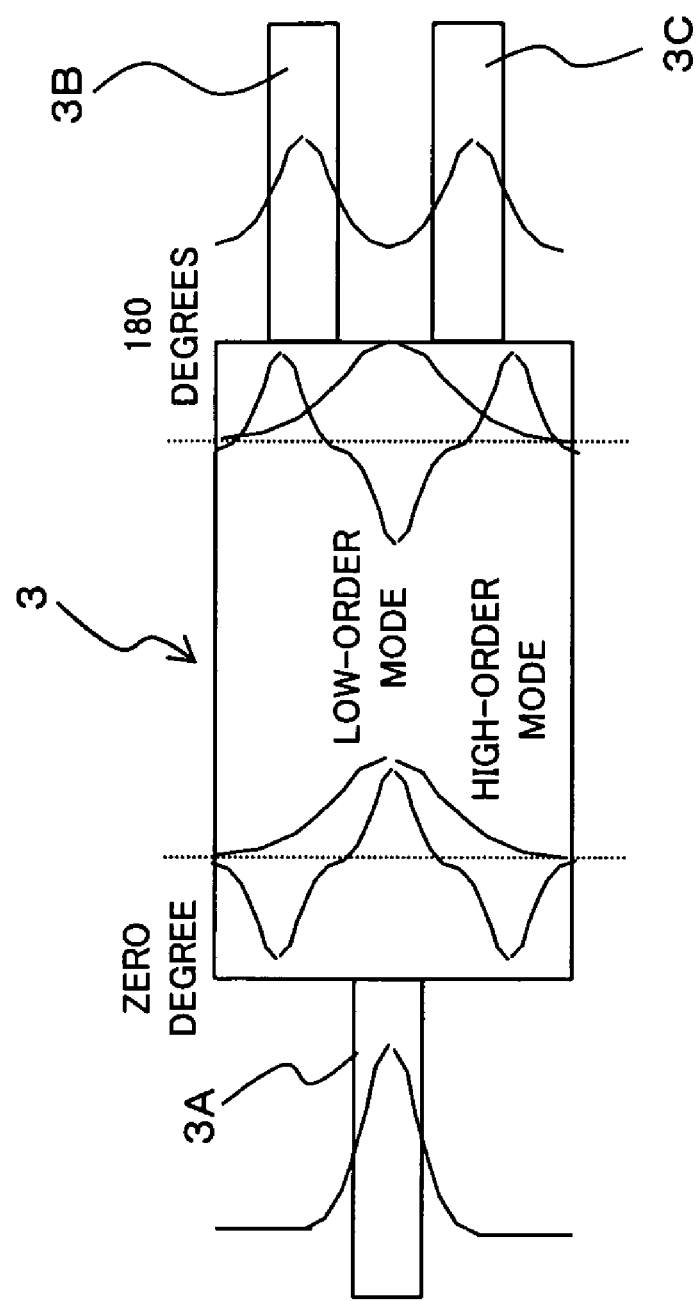
FIG. 4 is a schematic view for explaining the operating principle of a 1×2 MMI coupler which is provided in an input section of a clock modulator shown in FIG. 1.

In the RZ optical modulator described in the BACKGROUND OF THE INVENTION, in order to simplify design, the 2×2 MMI coupler having the same shape is used for the input section when the 2×2 MMI coupler 5 is used for the output section in the pre-stage clock modulator 1-1 (parallel waveguides 4A and 4B). However, in the embodiment, because it is necessary to secure symmetry, it is desirable that the Y branching waveguide 3 or a 1×2 MMI coupler is used for the clock signal input section (input section of the parallel waveguides 4A and 4B). As shown in FIG. 4, in the 1×2 MMI coupler, because the excited modes are different from each other in the propagation speed, the power of the light incident to the input port (arm portions) 3A is evenly distributed to the output ports (arm portions) 3B and 3C by utilizing the change in phase difference between the modes (high-order mode and low-order mode) according to the propagation distance. When the phase difference between the modes becomes 180°, the light powers are distributed to the output ports (arm portions) 3B and 3C, i.e. the light powers are distributed to the parallel waveguides 4A and 4B in the embodiment.

One end of each of the bending waveguides 6A and 6B (bent first and second waveguides) is connected to each of the parallel waveguides 7A and 7B of the data modulator 1-2, and the other end each of the bending waveguides 6A and 6B is folded and connected to each of the output ports 5C and 5D of the 2×2 coupler 5. The bending waveguides 6A and 6B constitute parts of the arm portions (parallel waveguides) of the data modulator 1-2 in collaboration with the parallel waveguides 7A and 7B. The semi-circular bending waveguide 6B is formed while separated from the inner-side bending waveguide 6A having a curvature radius R. The waveguide 6B has the curvature radius R+dR whose center is located at the position away from the center of the curvature radius R of the bending waveguide 6A by a distance dL in the longitudinal direction of the substrate 1 (rightward direction in FIG. 1). The lengths of binding waveguides 6A and 6B are set such that the propagation distance of the light (optical clock signal) propagating through the outer-side bending waveguide 6B is longer than that of the light propagating through the inner-side bending waveguide 6A by $2dL+2\pi dR$.

Thus, since the bending waveguide 6B is arranged outside the bending waveguide 6A, the bending waveguide 6B is longer than the bending waveguide 6A, which allows the larger delay to be given in the bending waveguide 6B when compared with the bending waveguide 6A. Namely, the bending waveguides 6A and 6B function as the delay connecting section which gives the differential delay to the two outputs of the 2×2 coupler 5 to output the light to the parallel waveguides 7A and 7B of the post-stage data modulator 1-2. More particularly, the bending waveguides 6A and 6B function as the folding delay connecting section which connects the two outputs of the 2×2 coupler 5 and the parallel waveguides 7A and 7B of the post-stage data modulator 1-2 respectively while the two outputs of the 2×2 coupler 5 are folded. Namely, the bending waveguides 6A and 6B function as the phase adjusting section. The phase adjusting section outputs the fifth phase adjusted light and the sixth phase adjusted light by adjusting the phases so that the third and fourth signal light obtained by the 2×2 coupler 5 which is of the coupling section have the same phases. Groove portions 16A and 16B are formed along the outer peripheries of the bending waveguides 6A and 6B in the substrate 1 near the bending waveguides 6A and 6B. Therefore, the light entrapment effect is improved in the bending waveguides 6A and 6B, and the loss caused by the leaky light can be suppressed in the bending waveguides 6A and 6B.

The propagation distance difference $2dL+2\pi dR$ is set so that the delay of a half of wavelength of the clock signal is given to the optical clock signal (one of optical compensation signals) propagating through the bending waveguide 6B. Accordingly, the phases of the optical clock signals propagating through the bending waveguides 6A and 6B become equal to each other at the output stages, and the optical clock signals whose phases are equal to each other propagate through the parallel waveguides 7A and 7B in the post-stage data modulator 1-2.

In the RZ optical modulator of the embodiment, the 2×2 coupler 5 generates the optical compensation signals from the outputs of the pre-stage clock modulator 1-1, and the optical compensation signals propagate respectively through the bending waveguides 6A and 6B whose propagation distances differ from each other. On the other hand, the delay of a half of wavelength of the clock signal is given to one of optical clock signals to match the phases of the optical clock signals with each other. Then, the optical clock signals are inputted to the post-stage data modulator 1-2 (parallel waveguides 7A and 7B).

In the case of the use of the LN substrate 1, the refractive index of the propagating microwave is set at 2.15 for that of the optical waveguides by adjusting the shapes of the signal electrodes 11 and 14 and ground electrodes 12 and 15. At this point, because the wavelength of the signal of 40 Gbps is 3.5 mm, the propagation distance difference 2dL+2πdR can be set at 1.75 mm in order to match the timing (phases) of the optical clock signals to the arm portions 7A and 7B. The timing of the optical clock signals can finely be adjusted (corrected) by adjusting bias voltage applied to a DC bias electrode 17. It is possible that the DC bias electrode 17 is provided on the clock modulator 1-1 side, or it is possible that the DC bias electrodes 17 are provided on the clock modulators 1-1 and 1-2.

In the pre-stage clock modulator 1-1, the electric signal is inputted to the signal electrode 11 so that the optical clock signals inputted to the 2×2 coupler 5 have the relationship as shown in Table 1.

TABLE 1

| Clock Signal | On Time | Off Time | During Bias |
|---|---|---|---|
| Phase at arm portion 5A (ΦA) | +π/4 | −π/4 | 0 |
| Phase at arm portion 5B (ΦB) | −π/4 | +π/4 | 0 |

In this case, the outputs of the clock modulator 1-1, i.e. the outputs of the 2×2 coupler 5 have the relationship as shown in Table 2.

TABLE 2

| Clock Signal | On Time | Off Time |
|---|---|---|
| Phase at arm portion 5C (ΦA1) | π/4 | Unknown because amplitude is zero |
| Phase at arm portion 5D (ΦB1) | Unknown because amplitude is zero | π/4 |

As can be seen from Tables 1 and 2, according to the turn-on and turn-off of the optical clock signal, the light having the phase of π/4 and the non-electric field state are alternately switched immediately after the outputs of the 2×2 coupler 5. At this point, when the (phase) delay (φB2) corresponding to the on time (or off time) of the optical clock signal is given to the arm portion 5D (or 5C), the phases of the optical clock signals propagating through the two arm portions 5C and 5D have the relationship shown in Table 3. As can be seen from Table 3, the optical clock signals whose phases are equal to each other are inputted to the post-stage data modulator 1-2 (parallel waveguides 7A and 7B).

TABLE 3

| Clock Signal | On Time | Off Time |
|---|---|---|
| Phase in arm A2 (ΦA2) | π/4 | Unknown because amplitude is zero |
| Phase in arm B1 (after delay ΦB2) | π/4 | Unknown because amplitude is zero |
| After delay ΔΦ = ΦA2 − ΦB2 | 0 | Unknown because amplitude is zero |

When the data signal (NRZ data signal) is supplied to the signal electrode 14, the refractive index of the parallel waveguide 7A is changed in response to the voltage change to generate the phase change in the optical clock signal propagating through the parallel waveguide 7A. Therefore, the interference between the light from the parallel waveguides 7A and 7B in the outgoing-side Y branching waveguide 8, and the optical modulation signal (RZ signal) is outputted as the outgoing light from the outgoing waveguide 9. Namely, the data modulator 1-2 functions as the optical modulator. The optical modulator performs the modulation using the phase adjusted light (fifth phase adjusted light and sixth phase adjusted light) from the bending waveguides 6A and 6B which are of the phase adjusting section.

As described above, according to the RZ optical modulator of the embodiment, the 2×2 coupler 5 generates the optical compensation signals without creating the leaky light from the output of the pre-stage clock modulator 1-1, and the optical compensation signals propagate through the bending waveguides 6A and 6B whose propagation distances differ from each other. Then, after the phases of the optical clock signals are matched with each other by giving the delay to one of the optical clock signals, the optical clock signals are inputted to the post-stage data modulator 1-2 (parallel waveguides 7A and 7B), so that even the light which is lost as the leaky light in the conventional outgoing-side Y branching waveguide can be utilized for the post-stage data modulator 1-2. Accordingly, the insertion loss can be reduced by about 3 dB compared with the conventional data modulator, and the low-loss RZ optical modulator can be realized.

Further, in the embodiment, since the optical modulators 1-1 and 1-2 are arranged in parallel on the substrate 1, the interaction length (length of portion where the electrodes 11, 12, 14, and 15 overlap the parallel waveguides 4A, 4B, 7A, and 7B respectively) can be increased as long as possible in the restricted chip size, so that the drive voltage can be decreased. In order to secure the modulation band, it is necessary to widen the distance between the signal electrode 11 (14) and the ground electrode 12 (15). In the case where the invention is applied to the RZ optical modulator driven by the high-speed signal of 40 Gbps, for example when the distance between the electrodes is set equal to or more than 50 μm, the loss can be reduced in the microwave to prolong the interaction length equal to or more than 50 mm. At this point, the drive voltage can be set equal to or less than 3V, so that the RZ optical modulator can be driven by the lower-cost driver.

In the configuration shown in FIG. 1, the input pad 11a for the clock signal RF and the RF input pad 14a for the NRZ data signal are arranged on one of the long sides of the chip (substrate 1). Therefore, a clock signal connector and an NRZ data signal connector can be arranged on one side of the module, and an occupied area can be reduced in the mounting.

In the substrate 1, the groove portions 16A and 16B are provided near the bending waveguides 6A and 6B while arranged along the outer peripheries of the bending waveguides 6A and 6B. Therefore, the light entrapment effect is improved in the bending waveguides 6A and 6B, and the loss caused by the leaky light can be suppressed in the bending waveguides 6A and 6B.

In the two optical modulators 1-1 and 1-2, it is not always necessary that the interaction lengths and the gaps between the electrodes are equalized to each other. Each band and each drive voltage are set according to the drivers. For example, for a CS-RZ (Carrier Suppressed Return to Zero) modulation method in which the clock signal is driven at double half-wavelength voltage $V\pi$ and at a half of frequency of a data bit rate, it is desirable that the half-wavelength voltage $V\pi$ is decreased while the band is sacrificed. In FIG. 1, emphasis is laid on the decrease in drive voltage of the clock signal, the gap between the clock signal electrodes 11 and 12 is caused to be narrower than the gap between the data signal electrodes 14 and 15 to reduce the half-wavelength voltage $V\pi$. At this point, for both the clock signal and the data signal, it is necessary that light speed matching is held between the light and the microwave, so that it is necessary that electrode thicknesses are changed for the clock signal and the data signal.

(A1) First Modification

Figure 2:
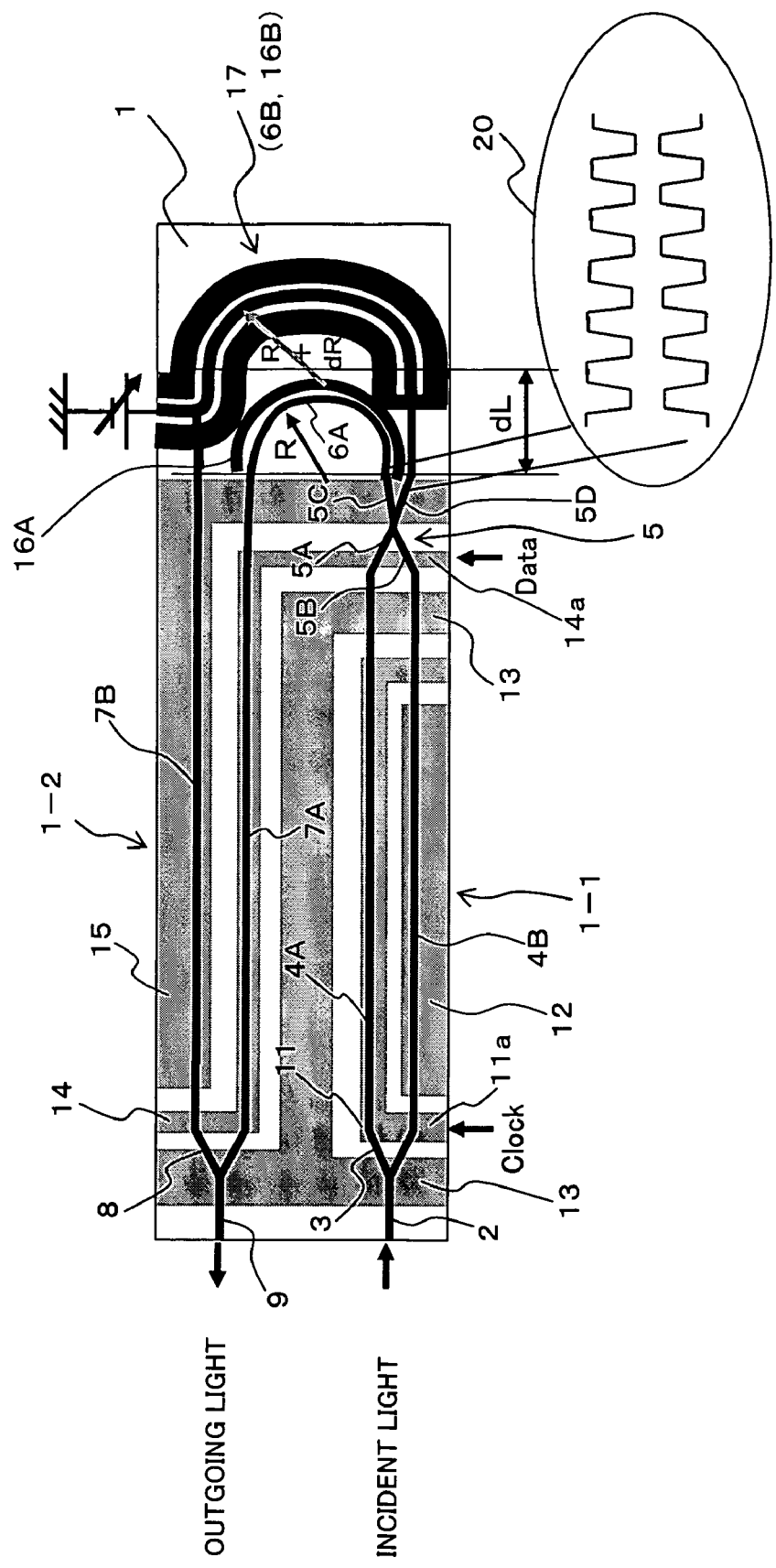
FIG. 2 is a schematic plan view showing a first modification of the RZ optical modulator show in FIG. 1.

In the RZ optical modulator shown in FIG. 1, the DC bias electrode 17 is arranged in the Y branching waveguide 8 of the post-stage NRZ modulator 1-2. However, when the DC bias electrode 17 is arranged in the Y branching waveguide 8, it is necessary to shorten the lengths of the electrodes 14 and 15 which overlap the parallel waveguides 7A and 7B, and the drive voltage is increased. Therefore, as shown in FIG. 2, the lengths of the electrodes 14 and 15 can be secured (maintained) as long as possible by arranging the DC bias electrode 17 on the bending waveguide 6B while the DC bias electrode 17 is provided along the bending waveguide 6B. In FIG. 2, the constituent indicated by the same numeral represents the identical or similar constituent described above.

(A2) Second Modification

Figure 5:
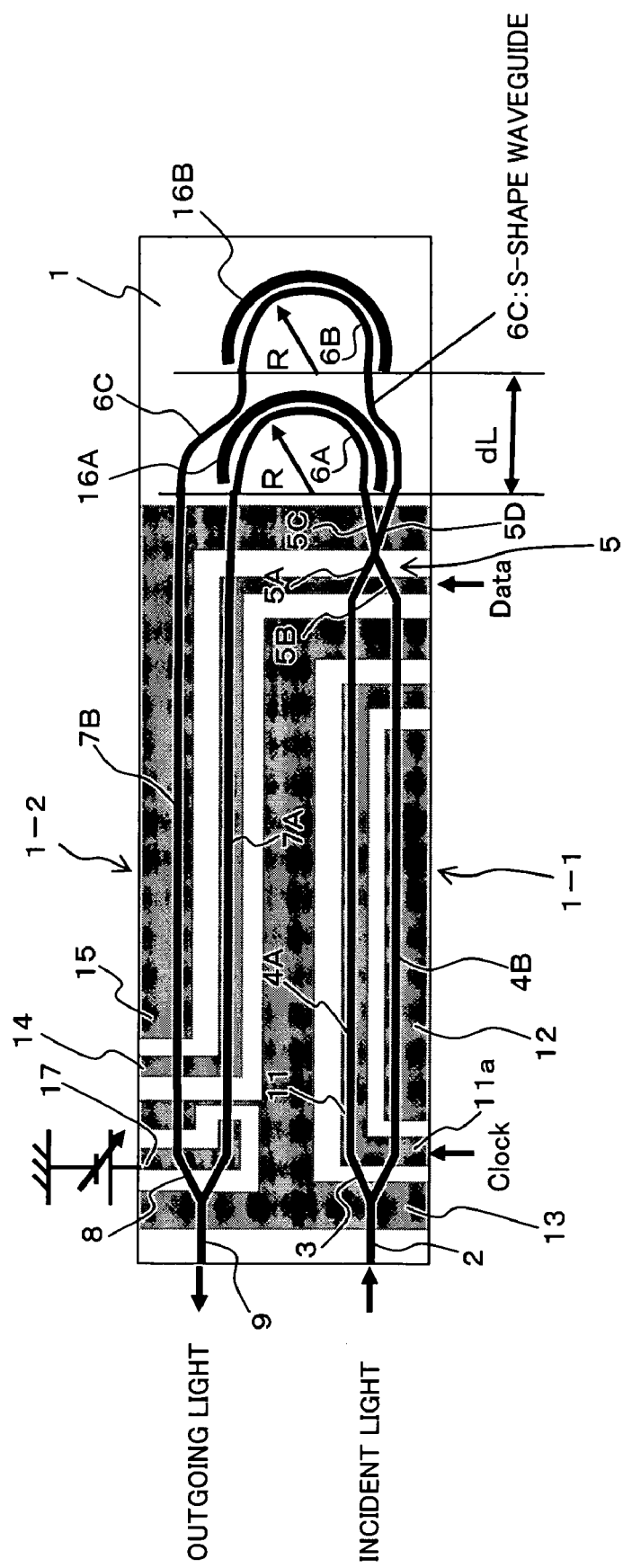
FIG. 5 is a schematic plan view showing a second modification of the RZ optical modulator show in FIG. 1.

In the structure shown in FIG. 1, when the difference in curvature radius dR between the bending waveguides 6A and 6B is large, the difference in light intensity between the two light is increased in the post-stage data modulator 1-2, and an extinction ratio of the light output is degraded. In order to prevent the degradation of the extinction ratio of the light output, it is desirable that the difference in curvature radius dR between the bending waveguides 6A and 6B is decreased as much as possible, e.g. the difference in curvature radius dR is set equal to or less than 100 µm. Therefore, as shown in FIG. 5, the curvature radiuses of the two bending waveguides 6A and 6B are set at (R) by inserting an S-shaped waveguide 6C having the larger curvature radius between the input and output portions (indicated by distance dL) of the bending waveguide 6B located on the outer periphery side. Accordingly, the extinction ratio having the same level as for the conventional RZ optical modulator shown in FIG. 16 can be secured. In FIG. 5, the constituent indicated by the same numeral represents the identical or similar constituent described above.

(A3) Third Modification

Figure 7:
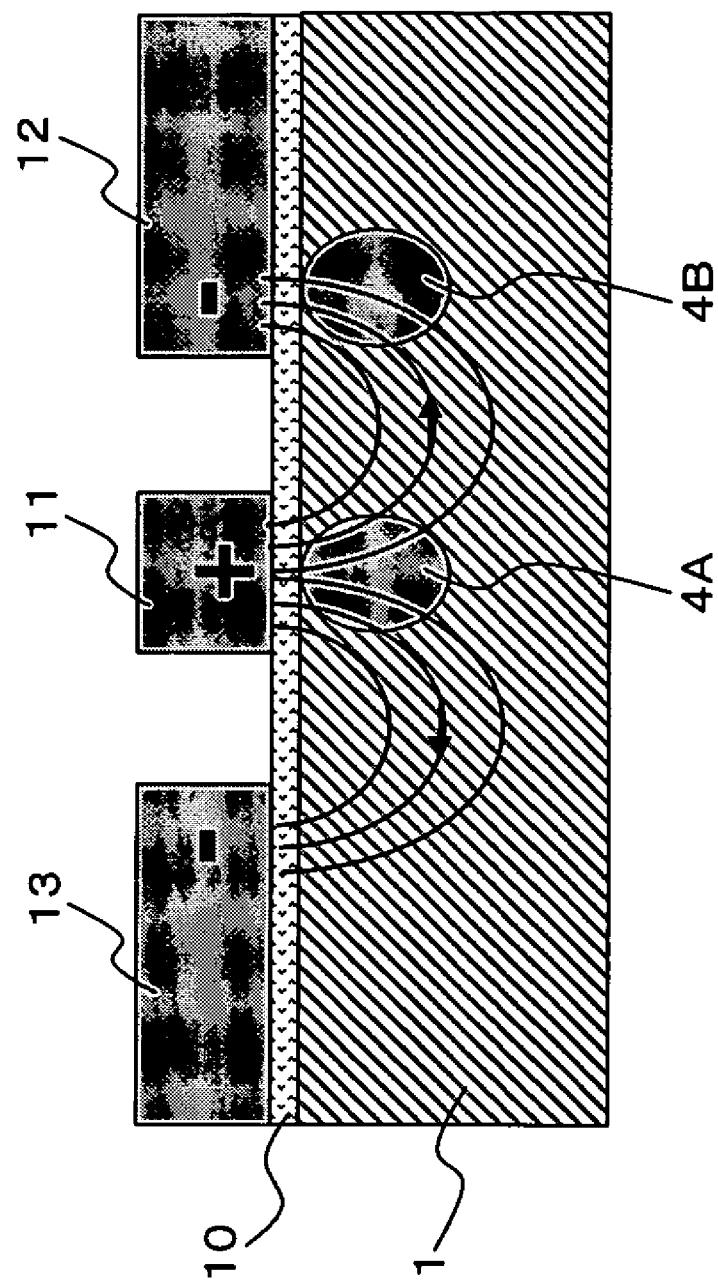
FIG. 7 is a sectional view taken on line A-A of FIG. 1.

In the configuration shown in FIG. 1, although the two outputs of the pre-stage clock modulator 1-1 are equal to each other in the output intensity, the chirps are inversed in the polarity. Because the two outputs of the pre-stage clock modulator 1-1 are multiplexed by the 2×2 coupler 5, distortion of the output waveform becomes troublesome in some cases. In the single-drive clock modulator 1-1 shown in FIG. 1, because magnitudes of the electric fields applied to the parallel waveguides 4A and 4B differ from each other as schematically shown in FIG. 7, the chirps inversed in the polarity are generated. FIG. 7 is a sectional view taken on line A-A of FIG. 1.

In order to avoid the inversed chirps, it is desirable that the amount of chirp generation is zero in the clock modulator 1-1. Therefore, as shown in FIG. 6, it is thought that the clock modulator 1-1 is formed in a dual drive configuration.

Namely, the signal electrodes 11A and 11B are patterned on the parallel waveguides 4A and 4B, and the clock signals having the compensation relationship are inputted to the signal electrodes 11A and 11B. In FIG. 6, the numerals 12A and 12B designate the ground electrode, and the constituent indicated by the same numeral represents the identical or similar constituent described above.

Figure 8:
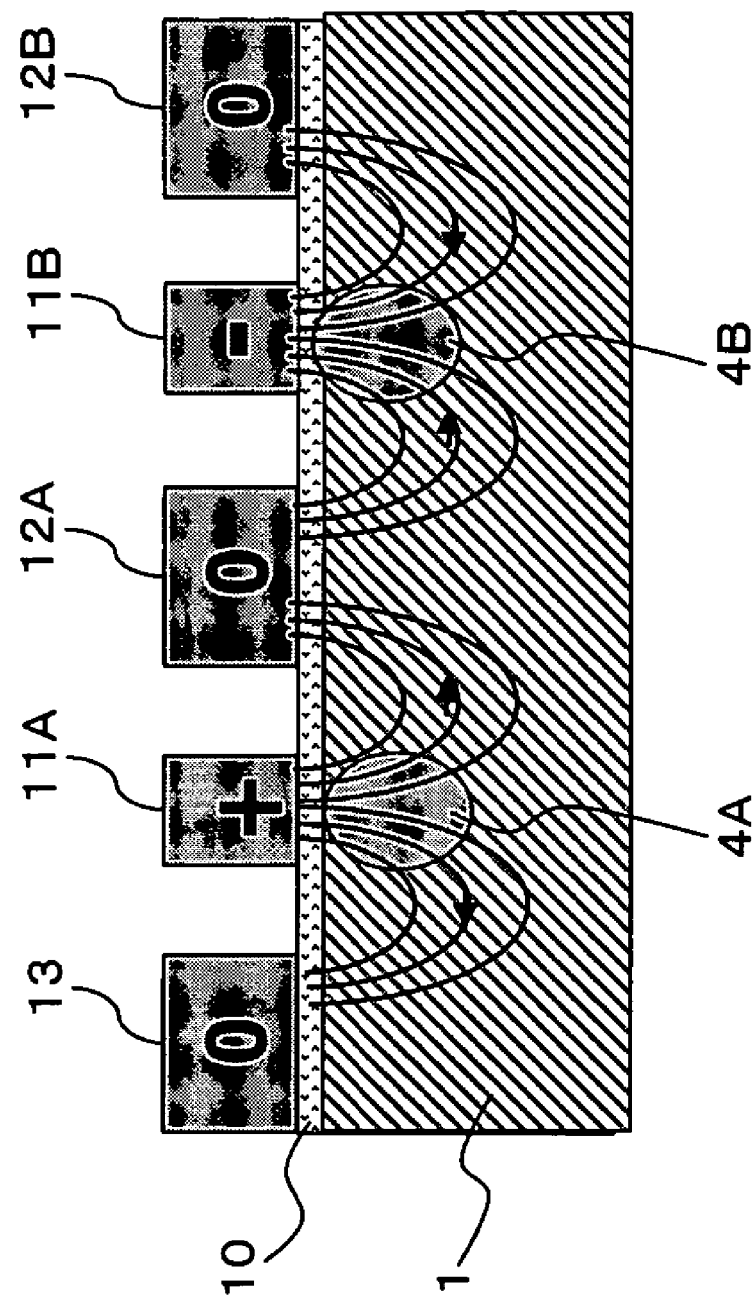
FIG. 8 is a sectional view taken on line A-A of FIG. 6.

Thus, when the clock modulator 1-1 is formed in the dual drive configuration, the electric fields in which the magnitudes are equal to each other and the polarities are opposite to each other can be applied to the parallel waveguides 4A and 4B as schematically shown in FIG. 8, so that the amount of chirp can be eliminated. FIG. 8 is a sectional view taken on line A-A of FIG. 6. Therefore, the output waveform of the clock modulator 1-1 (2×2 coupler 5) can be prevented from degrading. Further, in the dual drive configuration, the necessary drive voltage can be reduced.

Figure 6:
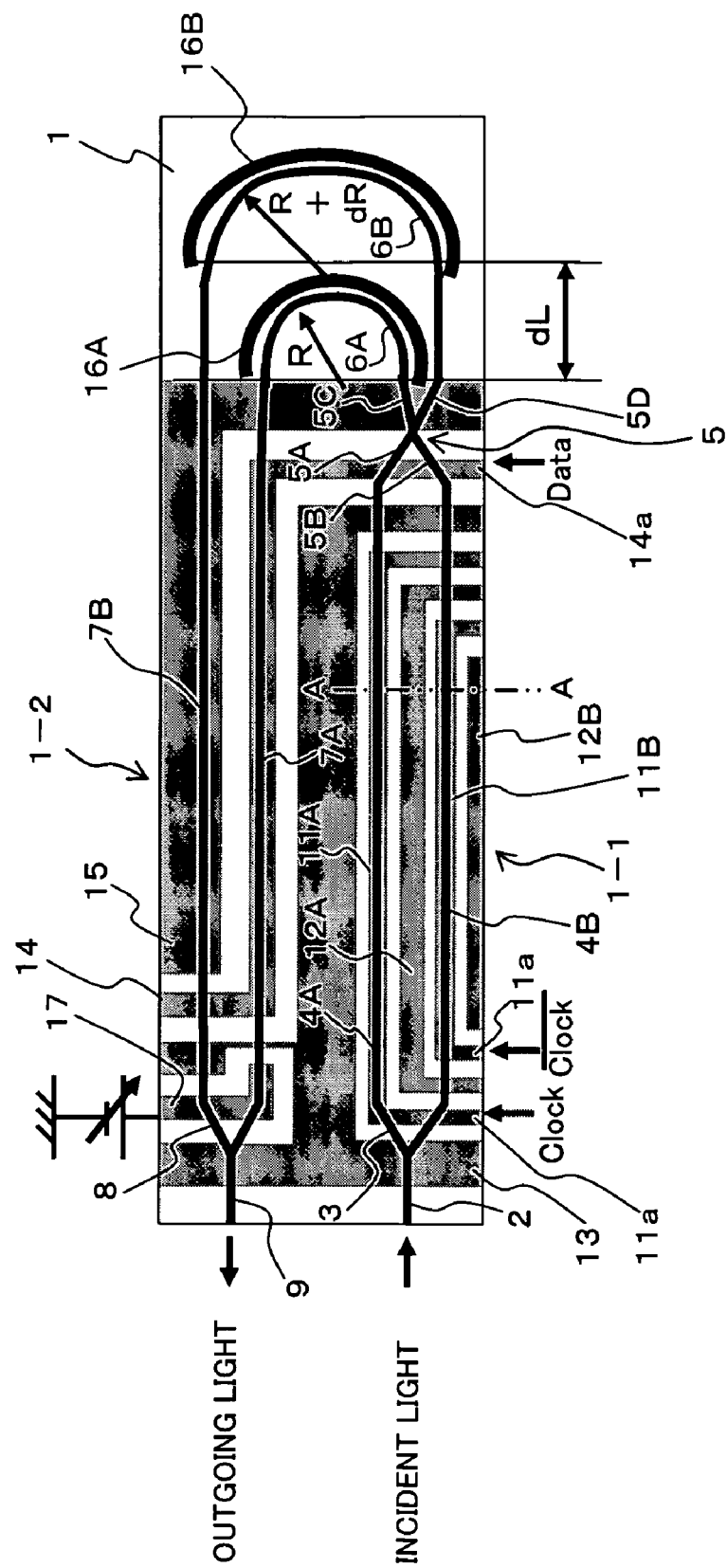
FIG. 6 is a schematic plan view showing a third modification of the RZ optical modulator show in FIG. 1.

The configuration of FIG. 6 shows an example of combination of the clock modulator 1-1 having the dual drive configuration and the data modulator 1-2 having the single drive configuration. On the contrary, the chirp can also be eliminated when the data modulator 1-2 is formed in the dual drive configuration.

In the configuration shown in FIG. 6, it is possible that the DC bias electrode 17 is provided on the bending waveguide 6B (or 6A) as described in FIG. 2, or it is possible that the S-shaped waveguide 6C is provided in order to equalize the curvature radiuses of the bending waveguides 6A and 6B as shown in FIG. 5. In both the cases, the above-described action and effect can be achieved.

(A4) Fourth Modification

Figure 9:
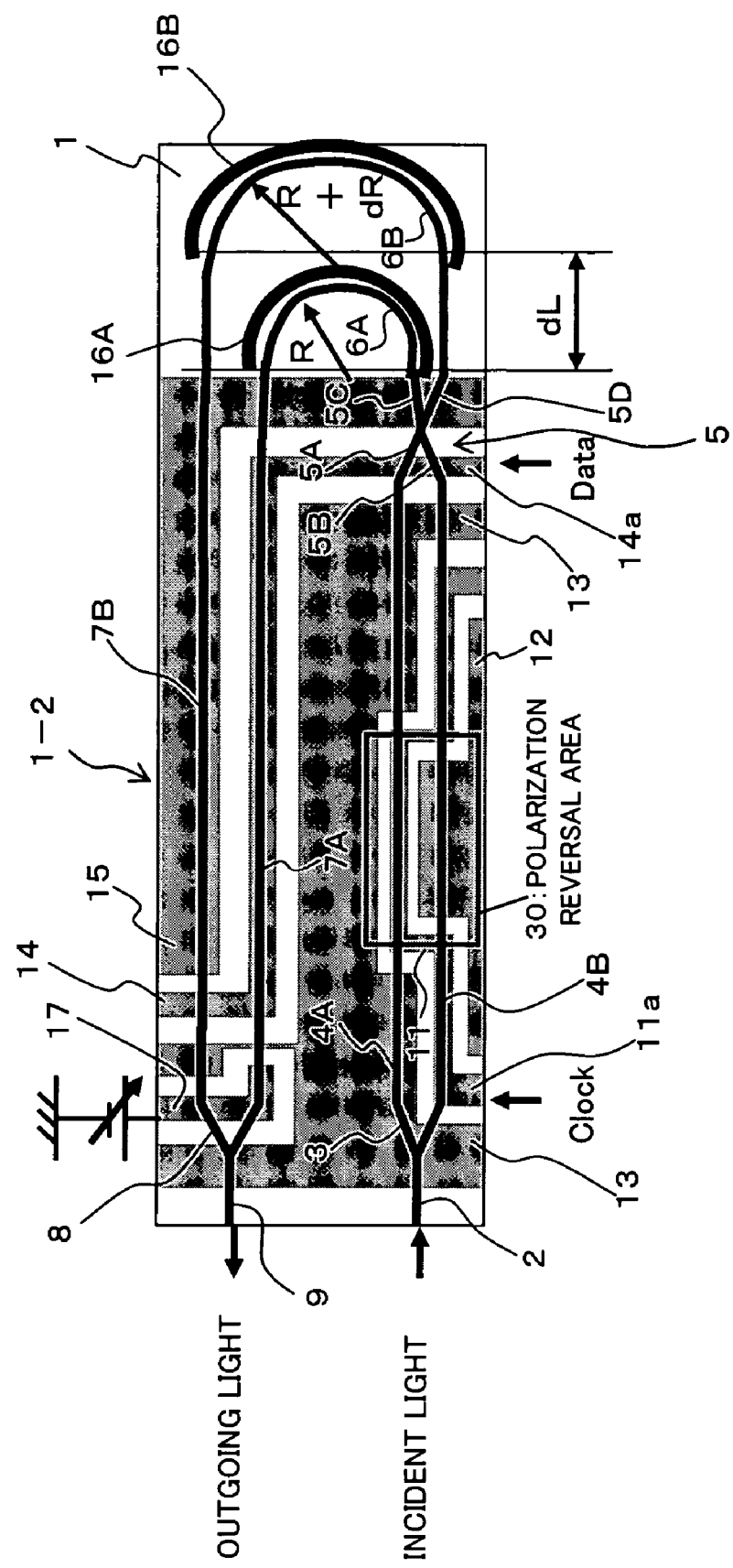
FIG. 9 is a schematic plan view showing a fourth modification of the RZ optical modulator show in FIG. 1.

In order to eliminate the chirp of the clock modulator 1-1, as shown in FIG. 9, it is thought that a polarization reversal area 30 is provided. The polarization reversal area 30 is formed in a part of the area in the substrate 1 where the parallel waveguides 4A and 4B are formed, and the polarization reversal area 30 is the area where the electro-optical effect characteristics are inversed compared with other areas (non-polarization-reversal area) on the substrate 1. The signal electrode 11 provided on one of the waveguides 4A and 4B is patterned (arranged) so as to spread over the other waveguide 4A or 4B at a boundary between the polarization reversal area 30 and the non-polarization-reversal area except for the polarization reversal area 30.

The polarization reversal area 30 is configured to occupy a half of each of the parallel waveguides 4A and 4B in the light propagation direction. Therefore, the light phase characteristics modulated by the polarization reversal area 30 and the light phase characteristics modulated in the nonpolarization-reversal area except for the polarization reversal area 30 can be equalized to each other while the polarities are mutually inverted. Accordingly, the amounts of wavelength chirps in the polarization reversal area 30 and the non-polarization-reversal area can cancel each other to suppress the amount of wavelength chirp of the optical clock signal outputted to the 2×2 coupler 5 so that the amount of wavelength chirp is substantially eliminated.

Preferably, the terminal side in the light propagation direction of the signal electrode 11 is connected to a resistor (not shown) while the clock signal is supplied from the input side in the light propagation direction of the signal electrode 11, which forms a progressive-wave electrode. Therefore, the speed of modulation performance of the clock modulator 1-1 can relatively be enhanced.

Thus, the amount of chirp can also be eliminated by providing the polarization reversal area 30 on the substrate 1, and the output waveform of the clock modulator 1-1 (2×2 coupler 5) can be prevented from degrading.

It is possible that the polarization reversal area 30 is provided on the data modulator 1-2 side, or it is possible that the polarization reversal areas 30 are provided in both the modulators 1-1 and 1-2. In the configuration shown in FIG. 9, it is also possible that the DC bias electrode 17 is provided on the bending waveguide 6B (or 6A) as described in FIG. 2, or it is also possible that the S-shaped waveguide 6C is provided in order to equalize the curvature radiuses of the bending waveguides 6A and 6B as shown in FIG. 5. In both the cases, the above-described action and effect can be achieved.

(A5) Fifth Modification

In the optical modulator, in order to adjust the voltage in the off state, the off light of each Mach-Zehnder interferometer is detected to set the bias voltage according to the intensity of the off light. In the conventional configurations shown in FIGS. 16 to 19, the off light of the optical clock signal can be detected by monitoring the leaky light generated in the outgoing-side Y branching waveguide 104. However, in the configuration shown in FIG. 1, since the leaky light is not generated, the off light cannot be detected.

Figure 10:
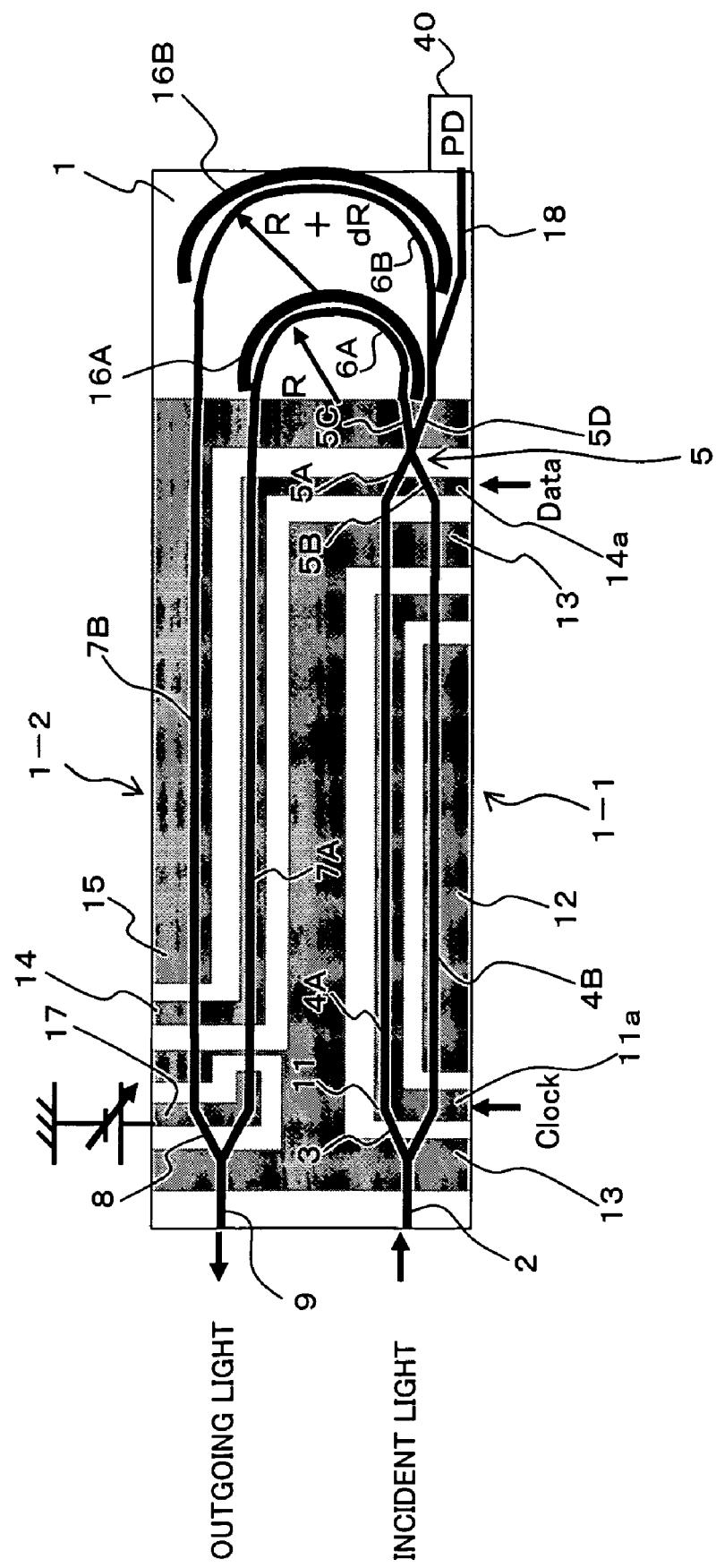
FIG. 10 is a schematic plan view showing a fifth modification of the RZ optical modulator show in FIG. 1.

Therefore, as shown in FIG. 10, a tap waveguide (first tap waveguide) 18 is provided. The tap waveguide 18 branches part of the propagation light from one of the arm portions of the data modulator 1-2, more particularly the tap waveguide 18 branches part of the propagation light from the bending waveguide 6B connected to the arm portion 5D of the 2×2 coupler 5, and the off light is detected by a photodiode (PD) 40. Accordingly, as with the conventional optical modulator, the bias voltage can be set by the detection of the off light. The off light can be detected by PD 40, as long as a branching ratio of the tap waveguide 18 to the bending waveguide 6B is set at, for example, about 10:1.

In FIG. 10, the constituent indicated by the same numeral represents the identical or similar constituent. The tap waveguide 18 can also be applied to the configurations shown in FIGS. 2, 5, 6, and 9.

(A6) Sixth Modification

Figure 11:
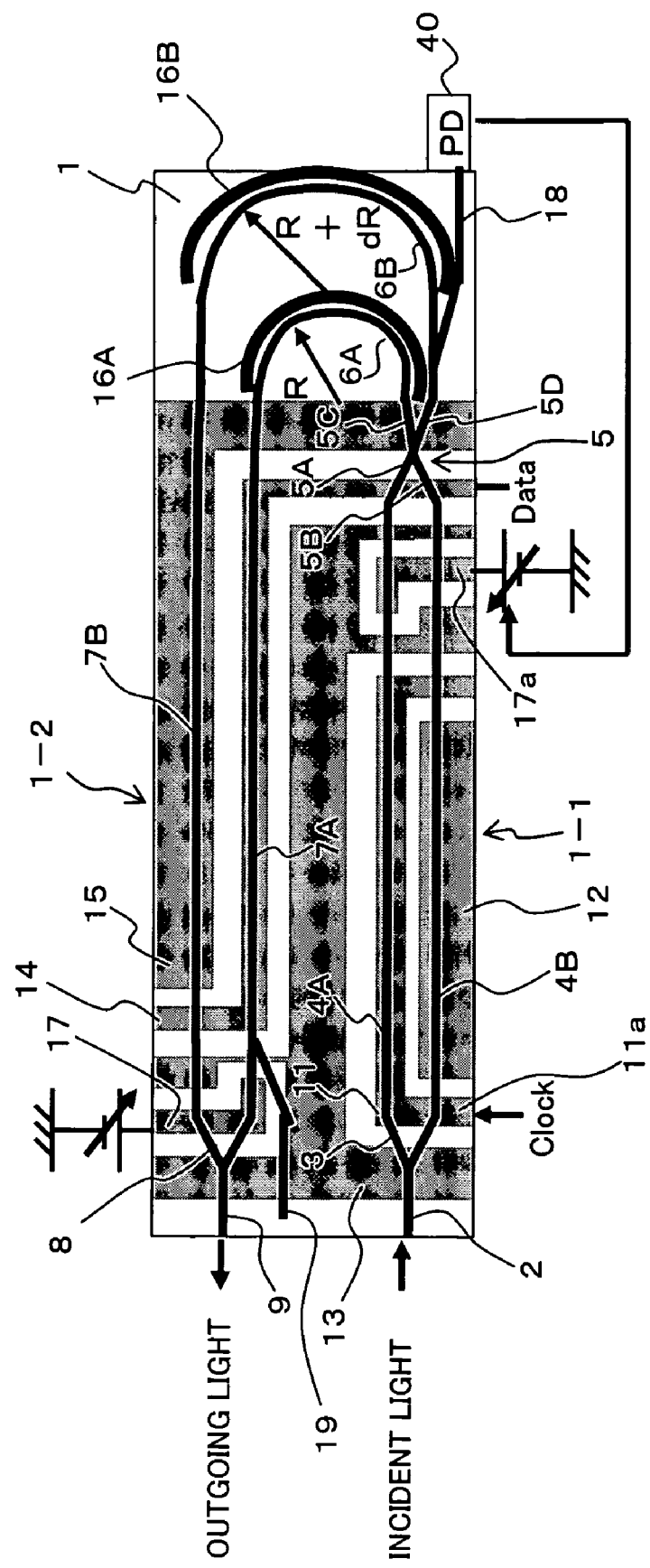
FIG. 11 is a schematic plan view showing a sixth modification of the RZ optical modulator show in FIG. 1.

In the configuration shown in FIG. 10, when the intensity of the light propagating through the parallel waveguide 7A and the intensity of the light propagating through the parallel waveguide 7B become unbalanced in the post-stage data modulator 1-2 due to the insertion of the tap waveguide 18, as shown in FIG. 11, the light intensity from the parallel waveguide 7A and the light intensity from the parallel waveguide 7B can be matched with each other by inserting a tap waveguide (second tap waveguide) 19 having the same branching ratio into the parallel waveguide 7A in the post-stage data modulator 1-2.

In FIG. 11, the numeral 17a designates a DC bias electrode which controls the drive operating point of the clock modulator 1-1, and the DC bias voltage applied to the DC bias electrode 17a is adjusted according to the intensity of the off light detected by PD 40. It is possible that PD is also provided in the output portion of the tap waveguide 19 to perform feedback control (adjustment) of the DC bias voltage applied to the DC bias electrode 17 according to the monitoring result of PD. In FIG. 11, the constituent indicated by the same numeral represents the identical or similar constituent. The tap waveguides 18 and 19 can also be applied to the configurations shown in FIGS. 2, 5, 6, and 9.

(A7) Seventh Modification

Figure 12:
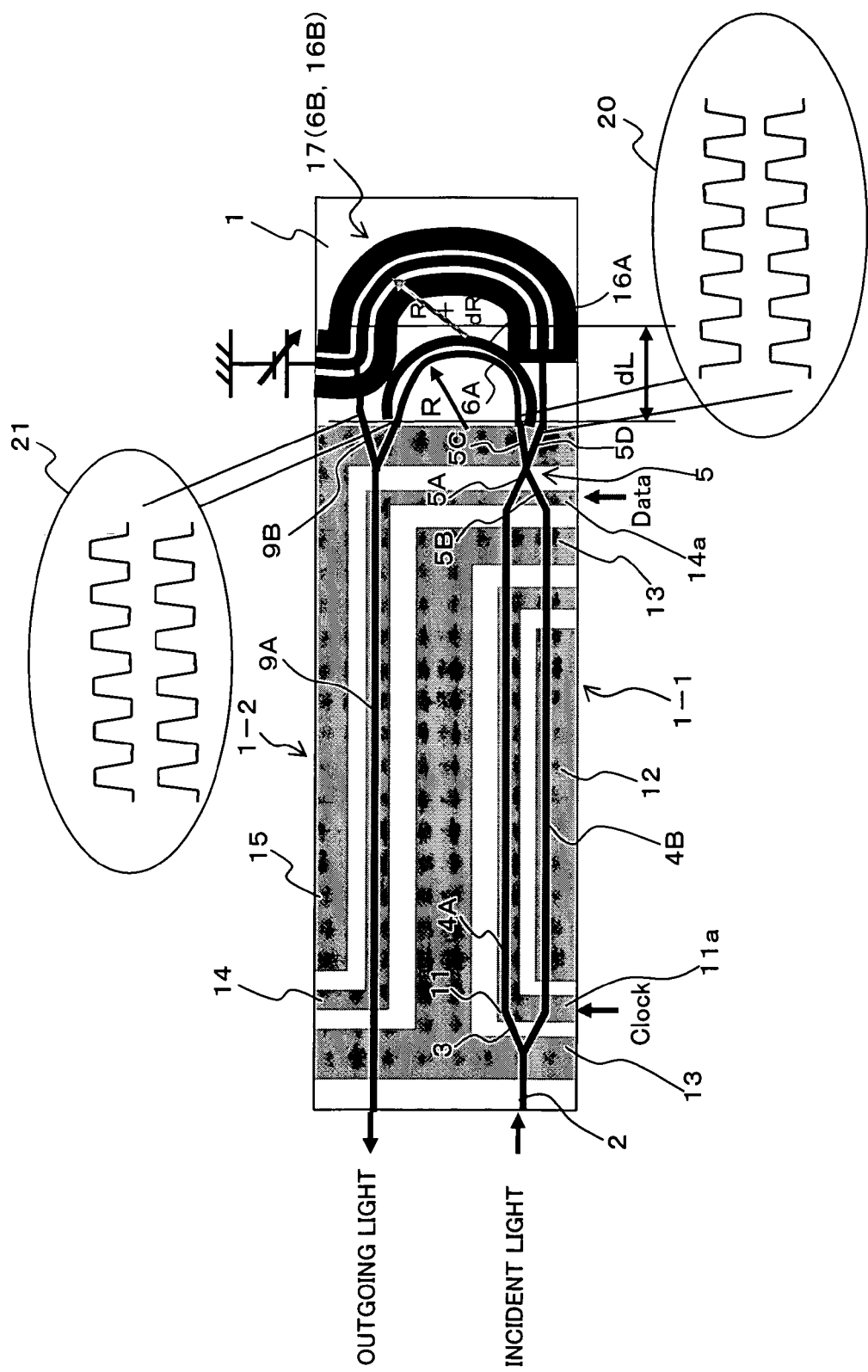
FIG. 12 is a schematic plan view showing a seventh modification of the RZ optical modulator show in FIG. 1.

In the embodiment and the first to sixth modifications, both the pre-stage first optical modulator (clock modulator) 1-1 and the post-stage second optical modulator (data modulator) 1-2 are formed in the intensity modulator. However, as shown in FIG. 12, it is possible that the post-stage data modulator 1-2 is formed in the phase modulator.

In this case, a waveguide (phase modulation waveguide) 9A which forms the interaction area and an incident-side Y branching waveguide 9B connected to the waveguide 9A are formed on the substrate 1. The waveguide 9A and the incident-side Y branching waveguide 9B constitute the second optical modulator 1-2. In this case, as with the configuration shown in FIG. 1, the intersecting waveguide (waveguide coupler (2×2 coupler)) 5 and the bending waveguides 6A and 6B are formed in the substrate 1. The 2×2 coupler 5 is connected to each of the parallel waveguides 4A and 4B of the first optical modulator 1-1. The bending waveguides 6A and 6B connect the outputs of the 2×2 coupler 5 and the incident-side Y branching waveguide 9B of the first optical modulator 1-1 (however, the bending waveguide 6B is hidden under the DC bias electrode 17, to be described later, in FIG. 12).

In the seventh modification, the semi-circular bending waveguide 6B is formed while separated from the inner-side bending waveguide 6A having the curvature radius R. The waveguide 6B has the curvature radius R+dR whose center is located at the position away from the center of the curvature radius R of the bending waveguide 6A by the distance dL in the longitudinal direction of the substrate 1 (rightward direction in FIG. 1). The lengths of binding waveguides 6A and 6B are set such that the propagation distance of the light (optical clock signal) propagating through the outer-side bending waveguide 6B is longer than that of the light propagating through the inner-side bending waveguide 6A by $2dL+2\pi dR$.

Even in the substrate 1, it is preferable that the groove portions 16A and 16B are provided near the bending waveguides 6A and 6B while arranged along the outer peripheries of the bending waveguides 6A and 6B (however, the groove portion 16B is hidden under the DC bias electrode 17, to be described later, in FIG. 12).

In addition, the propagation distance difference $2dL+2\pi dR$ is also set so that the delay of the half of wavelength of the clock signal is given to the optical clock signal (one of the optical compensation signals) propagating through the bending waveguide 6B. Therefore, the phases of the optical clock signals propagating through the bending waveguides 6A and 6B are matched with each other at the output stages, and the optical clock signals whose phases are matched with each other propagate through the incident-side Y branching waveguide 9A of the post-stage data modulator 1-2.

In the RZ optical modulator of the seventh modification, the 2×2 coupler 5 generates the optical compensation signals from the outputs of the pre-stage clock modulator 1-1, and the optical compensation signals propagate respectively through the bending waveguides 6A and 6B whose propagation distances differ from each other. On the other hand, the delay of the half of wavelength of the clock signal is given to one of optical clock signals to match the phases of the optical clock signals with each other. Then, the optical clock signals are inputted to the post-stage data modulator 1-2 (waveguides 9A). In FIG. 12, the constituent indicated by the same numeral represents the identical or similar constituent described above unless otherwise noted.

Even in the seventh modification, in the case of the use of the LN substrate 1, the refractive index of the propagating microwave is set at 2.15 for that of the optical waveguides by adjusting the shapes of the signal electrodes 11 and 14 and ground electrodes 12 and 15. At this point, because the wavelength of the signal of 40 Gbps is 3.5 mm, the propagation distance difference 2dL+2πdR can be set at 1.75 mm in order to match the timing (phases) of the optical clock signals to the arm portions 7A and 7B.

As described in the first modification (FIG. 2), the DC bias electrode 17 is provided on the bending waveguide 6B while arranged along the bending waveguide 6B, and the timing of the optical clock signals can finely be adjusted (corrected) by adjusting the bias voltage applied to the DC bias electrode 17 while the lengths of the electrodes 14 and 15 can be secured (maintained) as long as possible.

Even in the seventh modification, when the clock signal is supplied to the signal electrode 11 in the pre-stage clock modulator 1-1, as with the embodiment shown in FIG. 1, the optical compensation signals (see the numeral 20) in which the phases are mutually inverted are outputted at the output stages of the 2×2 coupler 5, and the optical compensation signals propagate through the bending waveguides 6A and 6B whose propagation distances differ from each other. Therefore, the phases of the optical compensation signals can be matched with each other in the input portions of the post-stage data modulator 1-2 (incident-side Y branching waveguide 9B) by giving the delay to one of the optical compensation signals (see the numeral 21).

Accordingly, since the optical clock signals whose phases are matched with each other are inputted to the post-stage data modulator 1-2 (waveguide 9A), even the light which is lost as the leaky light in the conventional outgoing-side Y branching waveguide can be utilized for the phase modulation of the NRZ data signal (supplied to the signal electrode 14) by the post-stage data modulator 1-2. As a result, the same action and effect as for the configuration shown in FIG. 1 can be obtained.

Even in the structure shown in FIG. 12, when the difference in curvature radius dR between the bending waveguides 6A and 6B is large, the difference in light intensity between the two light is increased in the post-stage data modulator 1-2, and the extinction ratio of the light output is degraded. In order to prevent the degradation of the extinction ratio of the light output, it is desirable that the difference in curvature radius dR between the bending waveguides 6A and 6B is decreased as much as possible, e.g. the difference in curvature radius dR is set equal to or less than 100 μm.

As with the second modification shown in FIG. 5, the curvature radiuses of the two bending waveguides 6A and 6B are set at (R) by inserting the S-shaped waveguide having the larger curvature radius between the input and output portions (indicated by distance dL) of the bending waveguide 6B located on the outer periphery side. Accordingly, the extinction ratio having the same level as for the conventional RZ optical modulator shown in FIG. 16 can be secured. The S-shaped waveguide can also be applied to the following modifications.

(A8) Eighth Embodiment

Figure 13:
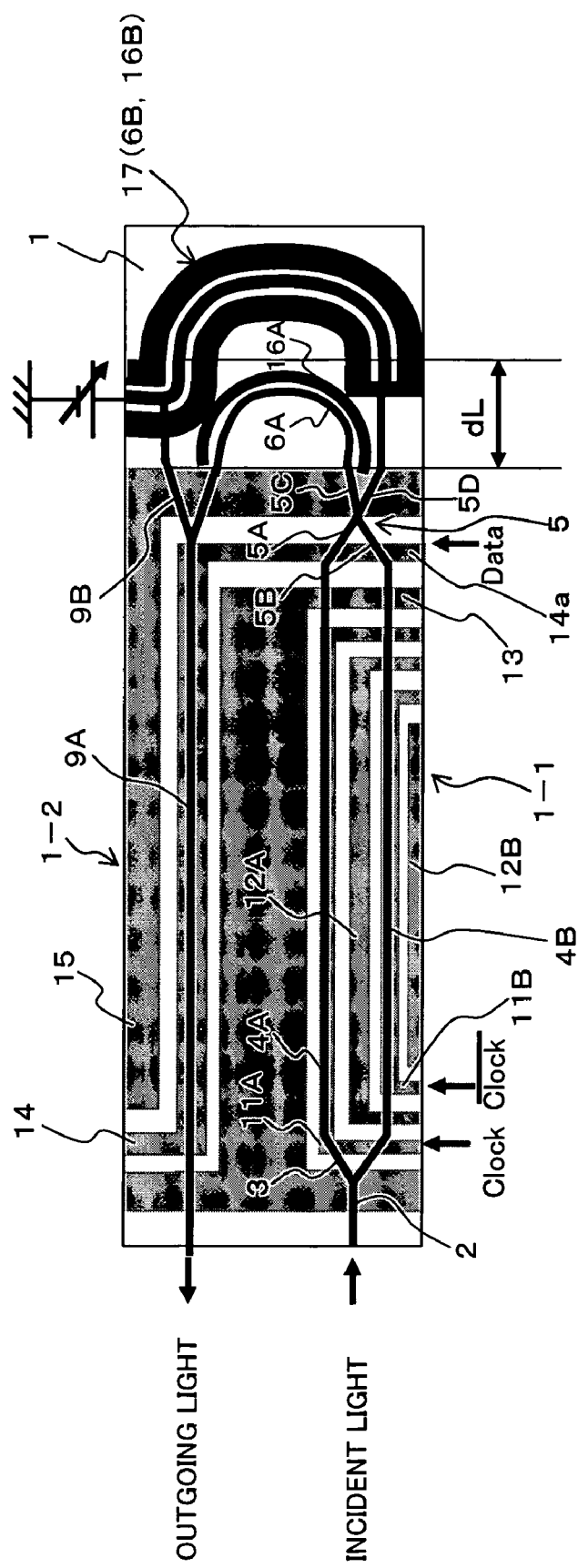
FIG. 13 is a schematic plan view showing an eighth modification of the RZ optical modulator show in FIG. 1.

In the configuration shown in FIG. 12, the clock modulator 1-1 has the single drive configuration, and the magnitudes of the electric fields applied to the parallel waveguides 4A and 4B differ from each other, so that the chirps whose polarities are mutually inversed are generated. Therefore, as with the third modification (FIG. 6), in order to eliminate the amount of chirp generation of the clock modulator 1-1, as shown in FIG. 13, the pre-stage clock modulator 1-1 is formed in the dual drive configuration.

Namely, the signal electrodes 11A and 11B are patterned on the parallel waveguides 4A and 4B, and the clock signals having the compensation relationship are inputted to the signal electrodes 11A and 11B. In FIG. 13, the numerals 12A and 12B designate the ground electrode, and the constituent indicated by the same numeral represents the identical or similar constituent described above.

Thus, when the clock modulator 1-1 is formed in the dual drive configuration, the electric fields in which the magnitudes are equal to each other and the polarities are opposite to each other can be applied to the parallel waveguides 4A and 4B as schematically shown in FIG. 8, so that the amount of chirp can be eliminated. Therefore, the output waveform of the clock modulator 1-1 (2×2 coupler 5) can be prevented from degrading. Further, in the dual drive configuration, the necessary drive voltage can be reduced.

(A9) Ninth Modification

Figure 14:
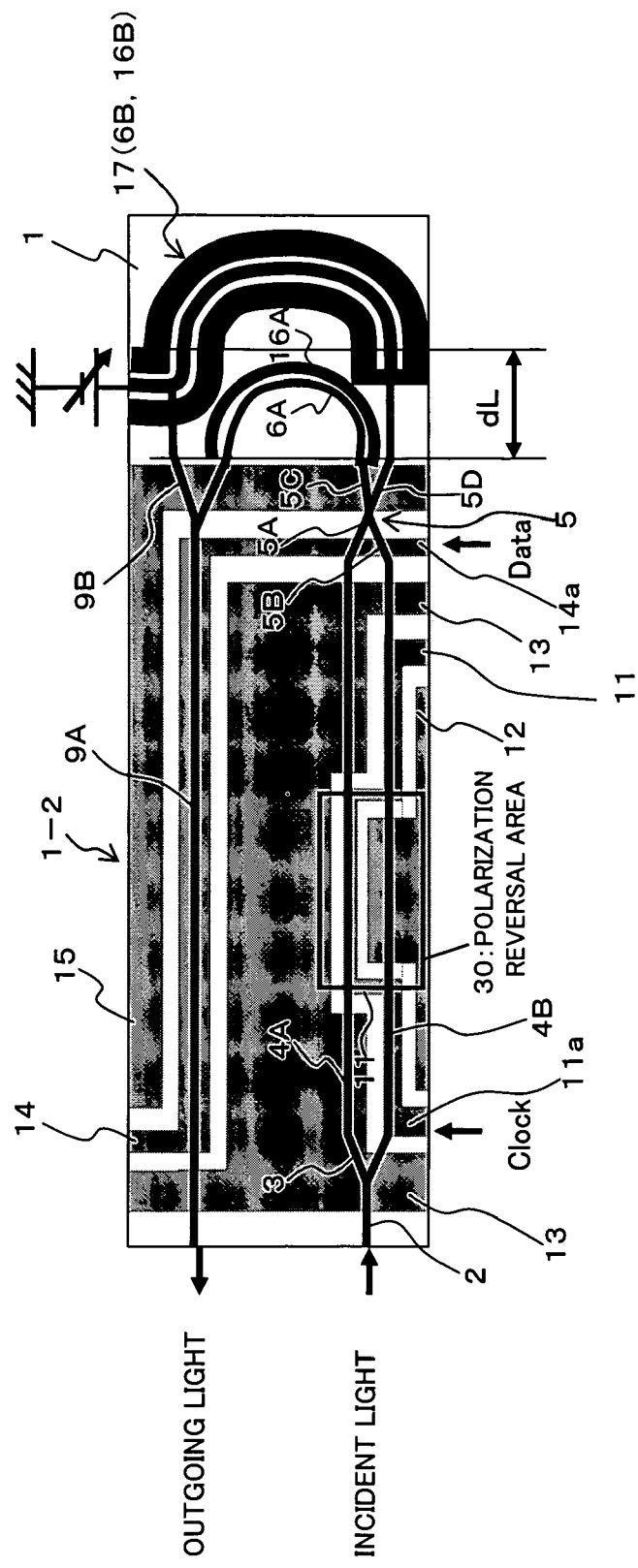
FIG. 14 is a schematic plan view showing a ninth modification of the RZ optical modulator show in FIG. 1.

In order to eliminate the chirp of the clock modulator 1-1, as with the fourth modification, it is also thought that a polarization reversal area 30 is provided as shown in FIG. 14. The polarization reversal area 30 is formed in a part of the area in the substrate 1 where the parallel waveguides 4A and 4B are formed, and the polarization reversal area 30 is the area where the electro-optical effect characteristics are inversed compared with other areas (non-polarization-reversal area) on the substrate 1. The signal electrode 11 provided on one of the waveguides 4A and 4B is patterned (arranged) so as to spread over the other waveguide 4A (or 4B) at a boundary between the polarization reversal area 30 and the non-polarization-reversal area except for the polarization reversal area 30.

Therefore, the same action and effect as for the fourth modification can be obtained.

(A10) Tenth Modification

Even in the configurations shown in FIGS. 12, 13, and 14, as with the fifth modification (FIG. 10) and the sixth modification (FIG. 11), the tap waveguides 18 and 19 can be provided in order to detect the off light. Namely, as with the configuration shown as a representative example in FIG. 12, the tap waveguide 18 which branches part of the propagation light from the bending waveguide 6B connected to the arm portion 5D of the 2×2 coupler 5 is provided as shown in FIG. 15, and the off light can be detected by the photodiode (PD) 40.

Accordingly, as with the conventional optical modulator, the bias voltage can be set by the detection of the off light. Namely, the DC bias voltage applied to the DC bias electrode 17a can be adjusted by the feedback control according to the intensity of the off light detected by PD 40. Even in the tenth modification, the off light can be detected by PD 40 as long as a branching ratio of the tap waveguide 18 to the bending waveguide 6B is set at, for example, about 10:1.

when the intensity of each of the light becomes unbalanced in the post-stage data modulator 1-2 due to the insertion of the tap waveguide 18, the light intensity from one of the light can be matched with the light intensity from the other light by inserting the tap waveguide 19 having the same branching ratio into the waveguide 9A in the post-stage data modulator 1-2.

Figure 15:
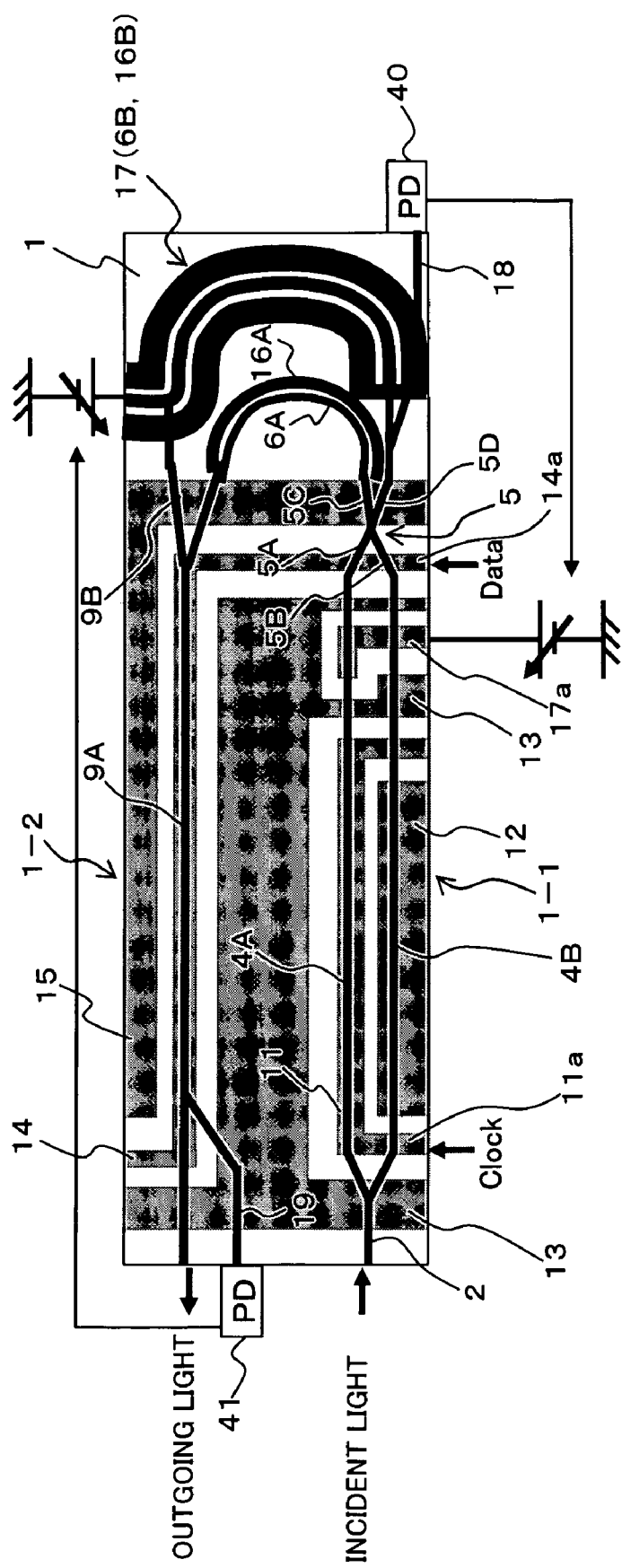
FIG. 15 is a schematic plan view showing a tenth modification of the RZ optical modulator show in FIG. 1.

As shown in FIG. 15, PD 41 is also provided in the output portion of the tap waveguide 19, and the feedback control (adjustment) of the DC bias voltage applied to the DC bias electrode 17 is performed according to the monitoring result of PD. The DC bias electrode 17 is provided on the bending waveguide 6B while arranged along the bending waveguide 6B. Therefore, the timing of each optical clock signal inputted to the incident-side Y branching waveguide 9B can be matched in an adaptable manner. In FIG. 15, the constituent indicated by the same numeral represents the identical or similar constituent.

The invention is not limited to the embodiment and the first to tenth modifications. Needless to say, various modifications and changes of the invention could be made without departing from the scope of the invention.

For example, in the embodiment and the modifications as described above, the clock modulator 1-1 and the data modulator 1-2 are arranged in parallel on the substrate 1. However, as with the configurations shown in FIGS. 16 and 17, even if the clock modulator 1-1 and the data modulator 1-2 are arranged in series on the substrate 1, the 2×2 coupler 5 generates the optical compensation signals from the outputs of the pre-stage clock modulator 1-1, the phases of the optical clock signals are matched with each other by giving the delay of the half of wavelength of clock signal to one of the optical clock signals, and then the optical clock signals are inputted to the post-stage data modulator 1-2. Therefore, the insertion loss can be reduced to realize the low-loss RZ optical modulator.

In the embodiment and the modifications as described above, the RZ optical modulator is formed on the substrate 1 using the Z-cut substrate. However, it is also possible that the RZ optical modulator is formed using an X-cut substrate.

What is claimed is:

1. An optical communication device comprising:
   a substrate which has electro-optical effect;
   a first optical modulator which has a pair of waveguides formed in the substrate;
   a second optical modulator which has a pair of waveguides formed in the substrate;
   a waveguide coupler which is provided in an output of the first optical modulator, the waveguide coupler being able to couple light propagating through the pair of waveguides of the first optical modulator into a coupled light, and branch the coupled light into first and second branched lights; and
   a delay connecting section which gives differential delay to the first and second branched lights with respect to each other, and inputs the differentially delayed first and second branched lights to the pair of waveguides, respectively, of the second optical modulator.

2. An optical communication device according to claim 1, wherein the first optical modulator is configured as a clock modulator which is driven by a clock signal, and the second optical modulator is configured as a data modulator which is driven by a data signal.

3. An optical communication device according to claim 2, wherein the differential delay by the delay connecting section is set to the differential delay corresponding to a half of wave of the clock signal.

4. An optical communication device according to claim 1, wherein the second optical modulator is formed on the substrate in parallel with the first optical modulator, and the delay connecting section is configured as a fold-back delay connecting section having bending waveguides which fold back two outputs of the waveguide coupler to connect the two outputs to the pair of waveguides of the second optical modulator.

5. An optical communication device according to claim 4, wherein groove portions are formed along outer peripheries of the bending waveguides in the substrate.

6. An optical communication device according to claim 4, wherein a difference between curvatures of the bending waveguides is equal to or less than 100 μm.

7. An optical communication device according to claim 5, wherein a difference between the curvatures of the bending waveguides is equal to or less than 100 μm.

8. An optical communication device according to claim 4, wherein an S-shaped waveguide is provided in an input portion or an output portion in one of the bending waveguides, and curvatures of said bending waveguides are set at the same value.

9. An optical communication device according to claim 1, wherein an interaction length between the pair of waveguides of the first optical modulator and the pair of waveguides of the second optical modulator is equal to or more than 50 mm.

10. An optical communication device according to claim 1, wherein a distance between a signal electrode provided on one waveguide of the pair of waveguides of the first optical modulator or the second optical modulator and a ground electrode provided on the other waveguide of the pair is equal to or more than 50 μm.

11. An optical communication device according to claim 2, wherein an input pad for the clock signal and an input pad for the data signal are arranged on one of long sides of the substrate.

12. An optical communication device according to claim 1, wherein a bias control electrode which controls a drive operating point of at least one of said optical modulators is provided on the substrate.

13. An optical communication device according to claim 12, wherein the bias control electrode is arranged on the delay connecting section.

14. An optical communication device according to claim 1, wherein the distance between a signal electrode provided on one waveguide of the pair of waveguides of the first optical modulator or the second optical modulator and a ground electrode provided on the other waveguide of the pair depends on the individual optical modulators.

15. An optical communication device according to claim 1, wherein thicknesses of a signal electrode provided on one waveguide of the pair of waveguides of the first optical modulator or the second optical modulator and a ground electrode provided on the other waveguide of the pair depend on the individual optical modulators.

16. An optical communication device according to claim 2, wherein the clock modulator is driven at a half of bit rate of the data signal and at voltage two times half-wave voltage.

17. An optical communication device according to claim 1, wherein an input portion of the pair of waveguides in the first optical modulator is a 1×2 MMI coupler.

18. An optical communication device according to claim 1, wherein an input portion of the pair of waveguides in the first optical modulator is a Y-branching waveguide.

19. An optical communication device according to claim 1, wherein one or both of said optical modulators are configured as a dual-drive type optical modulator.

20. An optical communication device according to claim 1, wherein a polarization reversal area is formed in a part of a substrate area where the pair of waveguides for one or both of said optical modulators are formed, characteristics of the electro-optical effect in the polarization reversal area are reversed when compared with other areas on the substrate, and a signal electrode provided on one waveguide of the pair of waveguides is arranged to spread over the other waveguide of the pair at a boundary between the polarization reversal area and the non-polarization-reversal area.

21. An optical communication device according to claim 1, wherein a first tap waveguide which branches part of propagating light is provided in one of the pair of waveguides in the second optical modulator.

22. An optical communication device according to claim 21, wherein a second tap waveguide which has the same branching ratio as the first tap waveguide has is provided in the other waveguide in the second optical modulator.

23. An apparatus comprising:
a first optical modulator including first and second waveguides through which first and second lights propagate, respectively;
a waveguide coupler coupling together the first and second lights after propagating through the first and second waveguides, respectively, into a coupled light, and branching the coupled light into first and second branched lights;
a delay connecting section giving a differential delay to the first and second branched lights with respect to each other; and
a second optical modulator including first and second waveguides inputting the differential delayed first and second branched lights, respectively.

24. An apparatus comprising:
a first optical modulator including first and second waveguides through which first and second lights propagate, respectively;
a waveguide coupler coupling together the first and second lights after propagating through the first and second waveguides, respectively, into a coupled light, and branching the coupled light into first and second branched lights;
means for giving differential delay to the first and second branched lights with respect to each other; and
a second optical modulator including first and second waveguides inputting the differential delayed first and second branched lights, respectively.

* * * * *

UNITED STATES PATENT AND TRADEMARK OFFICE
CERTIFICATE OF CORRECTION

PATENT NO. : 7,286,727 B2
APPLICATION NO. : 11/101485
DATED : October 23, 2007
INVENTOR(S) : Masaki Sugiyama It is certified that error appears in the above-identified patent and that said Letters Patent is hereby corrected as shown below:

Title page, item 57 Abstract,
Col. 2, line 6, delete "out put" and insert --output-- therefor.

Col. 20, line 21, after "giving" insert --a--.

Signed and Sealed this

Eighth Day of April, 2008

JON W. DUDAS
*Director of the United States Patent and Trademark Office*